US007236985B2

(12) United States Patent
Brecher

(10) Patent No.: US 7,236,985 B2
(45) Date of Patent: Jun. 26, 2007

(54) COMPUTERIZED SYSTEM AND METHOD FOR ACQUIRING AND ANALYZING DATA PERTAINING TO REAL ESTATE

(76) Inventor: Simon Brecher, 450 E. Kennedy Blvd., Lakewood, NJ (US) 08701

( * ) Notice: Subject to any disclaimer, the term of this patent is extended or adjusted under 35 U.S.C. 154(b) by 756 days.

(21) Appl. No.: 10/198,911

(22) Filed: Jul. 19, 2002

(65) Prior Publication Data
US 2003/0046129 A1 Mar. 6, 2003

Related U.S. Application Data

(63) Continuation-in-part of application No. 09/947,897, filed on Sep. 6, 2001.

(51) Int. Cl.
*G06F 7/00* (2006.01)
(52) U.S. Cl. ...................... 707/104.1; 705/10
(58) Field of Classification Search .............. 707/10, 707/102, 104.1; 705/7–10, 35
See application file for complete search history.

(56) References Cited

U.S. PATENT DOCUMENTS

| | | | |
|---|---|---|---|
| 5,361,201 A * | 11/1994 | Jost et al. ............... 705/35 |
| 5,414,621 A * | 5/1995 | Hough ..................... 705/10 |
| 5,680,305 A * | 10/1997 | Apgar, IV ............... 705/10 |
| 5,754,850 A * | 5/1998 | Janssen ................. 707/104.1 |
| 5,857,174 A * | 1/1999 | Dugan .................... 705/1 |
| 6,023,687 A * | 2/2000 | Weatherly et al. ....... 705/38 |
| 6,115,694 A * | 9/2000 | Cheetham et al. ....... 705/10 |
| 6,141,648 A * | 10/2000 | Bonissone et al. ....... 705/10 |
| 6,178,406 B1 * | 1/2001 | Cheetham et al. ....... 705/10 |
| 6,401,070 B1 * | 6/2002 | McManus et al. ........ 705/1 |
| 6,609,109 B1 * | 8/2003 | Bradley et al. .......... 705/35 |
| 6,609,118 B1 * | 8/2003 | Khedkar et al. ......... 705/36 R |
| 6,633,885 B1 * | 10/2003 | Agrawal et al. ......... 707/102 |
| 6,748,369 B2 * | 6/2004 | Khedkar et al. ......... 706/6 |
| 6,766,322 B1 * | 7/2004 | Bell ......................... 707/10 |
| 6,839,720 B1 * | 1/2005 | Thibodeau ............... 707/104.1 |
| 6,842,738 B1 * | 1/2005 | Bradley et al. .......... 705/10 |
| 6,871,140 B1 * | 3/2005 | Florance et al. ......... 701/207 |
| 6,876,955 B1 * | 4/2005 | Fleming et al. ......... 702/194 |
| 7,003,487 B1 * | 2/2006 | Skirpa ...................... 705/37 |

* cited by examiner

*Primary Examiner*—Andrew Joseph Rudy
(74) *Attorney, Agent, or Firm*—Henry I. Schanzer, Esq

(57) ABSTRACT

A substantial amount of publicly available and private information pertaining to buildings is inputted into a computerized data base programmed to produce statistical standards (norms) which can then serve as a basis for subsequent comparison with particular, selected, structures. The information is organized and formatted to facilitate the analysis of various income and expense items (including the taxes) pertaining to selected structures. Various special screens (forms) are used to aid in entering data pertaining to selected buildings and portfolios of buildings into the computerized data base and to interactively assist in the analysis of the data entered in view of the information contained in the computerized data base including the generation and display of significant statistical information regarding the selected properties and the generation of various reports. The system includes programs for simultaneously displaying the actual and adjusted values of selected income and expense items for the generation of reports for local property and/or income tax purposes, assessments determination, management purposes and/or investment decisions.

26 Claims, 34 Drawing Sheets

New Property Data Entry — Simon Brecher and Company

| LOOKUP | BBL | | BORO (MXKQS): | | Street No. | | Street | | |
|---|---|---|---|---|---|---|---|---|---|
| CLIENT | AAAAAAA | | BBL | 1-101-- | | Address | 3-3 Park | | Import New Properties |

Number of Lots: 1   Consolidated Lot numbers

AV CurYr: 4,216,500   AVPSF: 37.75   Bldg Class: D4   Elevator: Coop

Latitude: 59062   Longitude: 25953   ZipCode: 10038   ☑ Elevator  ☐ Walkup   Bldgs: 1   Gen ID:

[Property Data] [Assessments] [Notes]

☐ We will be doing the Tax Commission work for this property.

Tax Class: 2   Stories: 11   Rooms: 0   Year Built: 1900   Est. Altered: 1983   Neighborhood: 1GD ☐ Commercial or Mixed Use   Rating: 2A - 2B   Commercial Room Equiv.: 0

3/1a →

| | Unit Count | | Sq Ft | |
|---|---|---|---|---|
| | per DOF | per Client | per DOF | per Client |
| Apts | 41 | 0 | 99795 | 0 |
| Office | 0 | 0 | 0 | 0 |
| Stores | 0 | 0 | 11890 | 0 |
| Garage | 0 | 0 | 0 | 0 |
| Lot | 0 | 0 | 0 | 0 |
| Industrial | 0 | 0 | 0 | 0 |
| Other | 0 | 0 | 0 | 0 |
| Total SqFt: | | | 111,685 | 0 |
| SqFt Land: | | | 11,075 | 0 |

AKA:   Corp. Type:
Corporate Name:   Signer:
EIN:   Title:
Bldg Remark:

*If this is part of a consolidated property, enter the BBL for the parent here. NOTE: you must create the parent record first! Afterwards, go into the "Consolidated Form" under Property Review!*

Purchase Date:   Client Bldg Code:   [Create Link Between this record and Existing Child Records]
Purchase Price: 0   Client Manager:

New Property Data Entry — Simon Brecher and Company

LOOKUP BBL: AAAAAAA | BBL 1-101-- | Address: 3-3-Park | Street No. | Street | | | Bldgs: 1 | GenID:

CLIENT: | Consolidated Lot numbers | | | | Neighborhood

Number of Lots: 1 | AVPSF: $37.75 | Bldg Class: D4 | Elevator. Coop | | 1GD

AV CurYr.: 4,216,500 | Longitude: | 25953 ZipCode: 10038 | ☒ Elevator ☐ Walkup

Latitude: 59062

ACTUAL ASSESSMENT

| | Land Value: | Ex LV: | AV | Ex |
|---|---|---|---|---|
| F CurYrMinus2: | 1,642,500 | 28,098 | 3,690,000 | 28,098 |
| T CurYrMinus1: | 0 | 0 | 0 | 0 |
| F CurYrMinus1: | 1,642,500 | 48,414 | 3,960,000 | 48,414 |
| Tent CurYr: | 1,980,000 | 62,730 | 4,216,500 | 62,730 |
| F CurYr: | 1,980,000 | 62,730 | 216,500 | 62,730 |

TRANSITIONAL

| | MV | AV | Ex | Land Value: | Ex LV: |
|---|---|---|---|---|---|
| | | 3,408,600 | 27,512 | 1,642,500 | 27,512 |
| | | 0 | 0 | 0 | 0 |
| | 8,800,000 | 3,630,600 | 47,455 | 1,642,500 | 47,455 |
| | 9,370,000 | 3,799,800 | 61,517 | 1,710,000 | 61,517 |
| | 9,370,000 | 3,799,800 | 61,517 | 1,980,000 | 61,517 |

| ExpenseCategory | RPIEDetail | Cost | Move To | Amount |
|---|---|---|---|---|
| Wages | Wages | 20,044 | | 0 |
| Repairs | Appliances | 2,383 | Misc | 2383 |
| Cleaning | Cleaning | 860 | | 0 |
| Repairs | Waterproofing | 2,800 | | 0 |
| Light | Light & Power | 8,000 | | 0 |
| Fuel | Fuel | 32,056 | | 0 |
| Management | Management | 21,000 | | 0 |
| Misc | Legal | 12,284 | | 0 |
| Insurance | Insurance | 21,652 | | 0 |
| Misc | Accounting | 3,152 | | 0 |
| Wages | Payroll Taxes | 1,800 | | 0 |
| Misc | Personal | 2,161 | | 0 |
| Misc | Other Professional | 412 | | 0 |
| Water | Water | 2,500 | | 0 |
| Misc | Capital Repairs | 4,702 | | 0 |
| Paint | Water tank repair | 2,605 | | 0 |
| Misc | Appliances | 2,383 | | 0 |
| | | 0 | | 0 |

Figure 4A1

CAP REPAIRS

| ExpenseCategory | RPIEDetail | Cost | Move To | Amount | Detail | Total | Yrs | YrsRe |
|---|---|---|---|---|---|---|---|---|
| Wages | Wages | 18,000 | ↑ | 0 | | 0 | 0 | 0 |
| Repairs | Appliances | 4,856 | ↑ | 0 | | 0 | 0 | 0 |
| Cleaning | Cleaning | 945 | ↑ | 0 | | 0 | 0 | 0 |
| Light | Light & Power | 75,223 | ↑ | 0 | | 0 | 0 | 0 |
| Fuel | Fuel | 30,250 | ↑ | 0 | | 0 | 0 | 0 |
| Management | Management | 22,000 | ↑ | 0 | | 0 | 0 | 0 |
| Misc | Capital Repairs | 4,702 | ↑ | 0 | Maintenan | 47020 | 10 | 9 |
| Paint | Water tank repair | 2,605 | ↑ | 0 | Water tank | 26045 | 10 | 9 |
| Misc | Legal | 12,284 | ↑ | 0 | | 0 | 0 | 0 |
| Insurance | Insurance | 21,652 | ↑ | 0 | | 0 | 0 | 0 |
| Misc | Accounting | 3,152 | ↑ | 0 | | 0 | 0 | 0 |
| Wages | Payroll Taxes | 1,200 | ↑ | 0 | | 0 | 0 | 0 |
| Misc | Personal | 1,500 | ↑ | 0 | | 0 | 0 | 0 |
| Paint | Painting | 2,000 | ↑ | 0 | | 0 | 10 | 0 |
| Water | Water | 2,500 | ↑ | 0 | | 10000 | 2 | 0 |
| Insurance | Amortized expense | 5,000 | ↑ | 0 | Insurance | 0 | 10 | 0 |
| * | | 0 | | | | | | |

| IncomeCategory | RPIEDetail | Amount | Explanation |
|---|---|---|---|
| Warehouse/Lofts | Warehouse/Lofts | 198,888 | |
| Services (laundry, | Apartment Income | 12,000 | |
| Apartment Income | | 0 | |
| * | | | |

Comparative FUEL PER SQUARE FOOT Report

Comparative Analysis of Expenses for Sample Client Properties

Comparative INSURANCE per square foot Report for 1998

| Amount | ID | Street |
|---|---|---|
| $0.23 PSF | 3-235 | Hicks Street |
| $0.22 PSF | 3-5086 | Linden Boulevard |
| $0.20 PSF | 3-5162 | Ocean Avenue |
| $0.19 PSF | 3-5928 | 74th Street |
| $0.31 PSF | 3-6027 | 85th Street |
| $0.37 PSF | 4-140 | 47th Street |
| $0.37 PSF | 4-141 | 47th Street |
| $0.20 PSF | 4-193 | 41st Street |
| $0.22 PSF | 4-196 | 41st Street |
| $0.23 PSF | 4-1455 | 35th Avenue |
| $0.29 PSF | 4-1469 | 95th Street |
| $0.57 PSF | 4-8138 | Northern Boulevard |
| $0.24 PSF | 4-8857 | 85th Road |
| $0.20 PSF | 4-8932 | 88th Avenue |
| $0.21 PSF | 4-9304 | 115th Street |

Comparative INSURANCE per square foot Report for 1997

| Amount | ID | Street |
|---|---|---|
| $0.25 PSF | 3-235 | Hicks Street |
| $0.23 PSF | 3-5086 | Linden Boulevard |
| $0.22 PSF | 3-5162 | Ocean Avenue |
| $0.22 PSF | 3-5928 | 74th Street |
| $0.28 PSF | 3-6027 | 85th Street |
| $0.39 PSF | 4-140 | 47th Street |
| $0.39 PSF | 4-141 | 47th Street |
| $0.26 PSF | 4-193 | 41st Street |
| $0.26 PSF | 4-196 | 41st Street |
| $0.26 PSF | 4-1455 | 35th Avenue |
| $0.28 PSF | 4-1469 | 95th Street |
| $0.53 PSF | 4-8138 | Northern Boulevard |
| $0.28 PSF | 4-8857 | 85th Road |
| $0.21 PSF | 4-8932 | 88th Avenue |
| $0.22 PSF | 4-9304 | 115th Street |

FIG 10B

Comparative INSURANCE PER SQUARE FOOT Report

Comparative Analysis of Expenses for Sample Client Properties

Comparative INSURANCE per unit Report for 1998

| PU | Property ID | Address |
|---|---|---|
| $246 PU | 3-235 | Hicks Street |
| $243 PU | 3-5086 | Linden Boulevard |
| $237 PU | 3-5162 | Ocean Avenue |
| $237 PU | 3-5928 | 74th Street |
| $268 PU | 3-6027 | 85th Street |
| $245 PU | 4-140 | 47th Street |
| $255 PU | 4-141 | 47th Street |
| $229 PU | 4-193 | 41st Street |
| $238 PU | 4-196 | 41st Street |
| $226 PU | 4-1455 | 35th Avenue |
| $226 PU | 4-1469 | 95th Street |
| $238 PU | 4-8857 | 85th Road |
| $234 PU | 4-8932 | 88th Avenue |
| $235 PU | 4-9304 | 115th Street |

Comparative INSURANCE per unit Report for 1997

| PU | Property ID | Address |
|---|---|---|
| $268 PU | 3-235 | Hicks Street |
| $252 PU | 3-5086 | Linden Boulevard |
| $259 PU | 3-5162 | Ocean Avenue |
| $272 PU | 3-5928 | 74th Street |
| $215 PU | 3-6027 | 85th Street |
| $254 PU | 4-140 | 47th Street |
| $264 PU | 4-141 | 47th Street |
| $304 PU | 4-193 | 41st Street |
| $288 PU | 4-196 | 41st Street |
| $250 PU | 4-1455 | 35th Avenue |
| $222 PU | 4-1469 | 95th Street |
| $276 PU | 4-8857 | 85th Road |
| $250 PU | 4-8932 | 88th Avenue |
| $244 PU | 4-9304 | 115th Street |

FIG. 10C

Comparative INSURANCE PER UNIT Report

Comparative LIGHT & POWER PER SQUARE FOOT Report

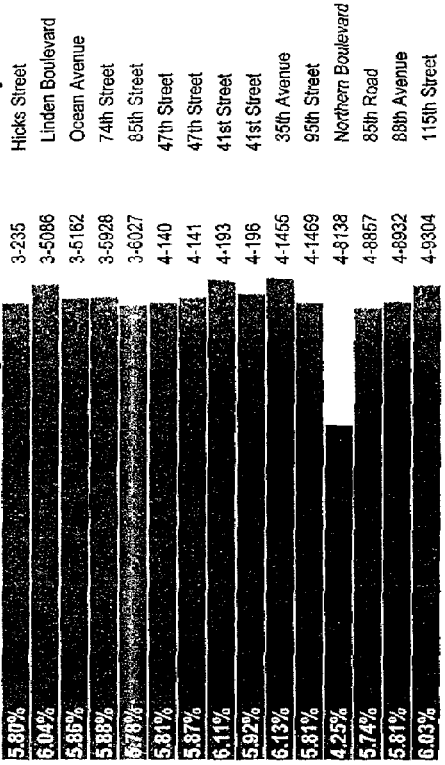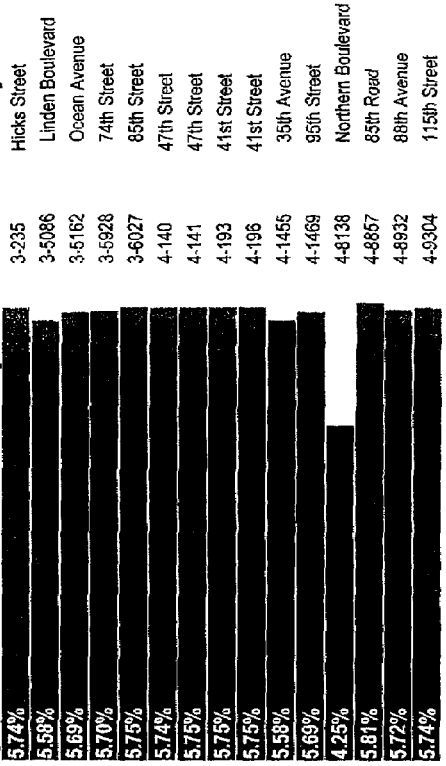
FIG. 10E
Comparative MANAGEMENT AS A PERCENT OF INCOME Report

ANALYSIS OF COMPARATIVE ASSESSMENTS FOR SAMPLE CLIENT PROPERTIES

Actual assessment of 3-5241
Ocean Avenue
$9.77 Per Sq Ft

ANALYSIS OF COMPARATIVE I&E FOR ACE MANAGEMENT CO.

1-772-45 214-16 7th Avenue

Actual 1999 Fuel Per Square Foot: $1.30

*20 Elevator properties within 1250 ft E-W and 1250 ft N-S.*

| $0.03 | $0.24 | $0.56 | | $1.15 | $1.52 |
|---|---|---|---|---|---|
| Min | 20% | Avg | | 80% | Max |

*54 All Elevator And Walkup properties within 1000 ft E-W and 1000 ft N-S.*

| $0.03 | $0.42 | $0.95 | $1.48 | $2.94 |
|---|---|---|---|---|
| Min | 20% | Avg* | 80% | Max |

Actual 1999 Fuel Per Unit: $749

*20 Elevator properties within 1250 ft E-W and 1250 ft N-S.*

| $25 | $189 | $443 | $788 | $1,122 |
|---|---|---|---|---|
| Min | 20% | Avg | 80% | Max |

*54 All Elevator And Walkup properties within 1000 ft E-W and 1000 ft N-S.*

| $25 | $251 | $605 | $1,007 | $2,793 |
|---|---|---|---|---|
| Min | 20% | Avg* | 80% | Max |

Actual 1999 Light Per Square Foot: $0.42

*21 Elevator properties within 1250 ft E-W and 1250 ft N-S.*

| $0.03 | $0.18 | $0.35 | $0.43 | $1.12 |
|---|---|---|---|---|
| Min | 20% | Avg* | 80% | Max |

*58 All Elevator And Walkup properties within 1000 ft E-W and 1000 ft N-S.*

| $0.03 | $0.16 | $0.47 | $0.78 | $1.93 |
|---|---|---|---|---|
| Min | 20% | Avg* | 80% | Max |

Actual 1999 Light Per Unit: $240

*21 Elevator properties within 1250 ft E-W and 1250 ft N-S.*

| $22 | $135 | $279 | $423 | $1,812 |
|---|---|---|---|---|
| Min | 20% | Avg* | 80% | Max |

*58 All Elevator And Walkup properties within 1000 ft E-W and 1000 ft N-S.*

| $22 | $104 | $315 | $423 | $1,812 |
|---|---|---|---|---|
| Min | 20% | Avg* | 80% | Max |

FIG 10G

| Range of Values between 20th and 80th percentiles. | Actual IE value of subject property. |
|---|---|
| Extreme values. Maximum value shown is not always to scale. ||
| 50th percentile: half of all properties have values that are lower than 50th percentile, half are higher. ||
| * - Average is calculated excluding one extremely high value. || rptIEGraphPerCompSummary

Assessment Recommendations for Sample Client

Brooklyn - Block 235
Hicks Street

I. Physical Data (per DOF)

| Building Class and Description | Gross Square Feet | Unit Data | | Residential | | Commercial | | Estimated Sq Ft per Unit | Year Built | Stories |
|---|---|---|---|---|---|---|---|---|---|---|
| | | Per DOF | ▲ | Units | 46 | Square Feet | 0 | | | |
| D9: Elevator Misc. | 48,414 | Per Client | ▲ | Units | 45 | Square Feet | 0 | 947 | 1920 | 6 |

II. Assessments: Tentative 2000-2001 vs. Final 1999-2000

| | Exempt | Land Value | Building Value | AV per Square Foot | Increase/Decrease vs. Prev. Year | Transitional Total AV | Transitional Exempt | Actual Billable | Calculated Tax Bill | | Tax psf |
|---|---|---|---|---|---|---|---|---|---|---|---|
| Total AV 2000-2001 | | | | | | | | | 2 | 3 | 4 |
| $1,377,000 | $0 | $445,500 | $931,500 | $28.44 | 19% | $1,073,700 | $0 | $1,073,700 | $116,507 | | $2.41 |
| Total AV 1999-2000 | Exempt | Land Value | Building Value | AV per Square Foot | | Transitional Total AV | Transitional Exempt | Actual Billable | Calculated Tax Bill | | Tax psf |
| | | | | | | | | | 2 | 3 | 4 |
| $1,156,500 | $0 | $445,500 | $711,000 | $23.89 | | $985,500 | | $985,500 | $106,937 | | $2.21 |

Data Last Updated for the 99-00 Season

J-51 Exemptions | J-51 Abatements

| Initial Year of Exemption | Maximum Exempt | Initial Year of Abatement | Certified Cost of Alteration | Abatement Percent | Annual Abatement | Abate Bal. Remaining | Maximum Abatement Yrs | Est. Yrs Remaining | Calculated Tax Bill | Tax Bill after Abatements |
|---|---|---|---|---|---|---|---|---|---|---|
| | | | | | | | | | 3 | |
| | | 1991-1992 | $79,100 | 90% | $6,592 | $15,161 | 20 | 2 | | |
| TOTALS | | | | | | $6,592 | $15,161 | | $116,507 | $109,916 |

III. Potential 2000 Appeal Venue: Assessor and / or Tax Commissio | Case Strength: Fair

See Income and Expense Data and narrative below

IV. Income and Expense Information

| Accounting Period | Income | Income Per Sq Ft | Expenses | Expenses Per Sq Ft | NOI | NOI% |
|---|---|---|---|---|---|---|
| 1/98-12/98 | $561,300 | $11.59 | $166,249 | $3.43 | $395,051 | 70.36% |
| 1/97-12/97 | $535,533 | $11.06 | $152,146 | $3.14 | $383,387 | 71.59% |
| '98 vs '97 | 5% | 4.8% | 9% | 9.3% | 3.04% | -1.69% |

| High Expenses | HIGH: Light & Power at $0.24 per square foot, Water & Sewer at $374 per unit. |
| Low Expenses | LOW: Insurance at $0.23 per square foot; VERY LOW: Wages at $0.08 per square foot, Fuel at $0.33 per square foot. |

Please note that throughout this Report any reference to the "NOI" refers to the Net Operating Income before debt service and real estate taxes. By definition, debt contains too many variables to analyze properties on a level playing field, and Finance therefore makes all calculations to determine value based on a theoretically free and clear property using a market cap rate applied to Income less allowable (and possibly artificially adjusted) Expenses as reported on the RPIE form. For technical reasons, real estate taxes are also compensated as a function of a separate cap rate rather than being a standard deductible expense. Please see the Primer on Real Property Assessments for a fuller discussion on the application of the cap rates and other ratios discussed herein.

In the case of this property, I am almost certain that the assessor artificially reduced the Repair expense if the RPIE form was filed with the true and full boiler (1) Estimated Square Feet per unit after deducting 10% for common areas. (2) Actual Billable based on lower of (Total - Exempt) or (Transitional Total - Transitional Exempt)
(3) Calculation for report purposes at 10.851% for residential, 9.989% for commercial. Actual bill is after Exemptions, before Abatements, (4) Actual taxes per square foot based on total building sq ft OR on lot sq ft for vacant land and may vary based on SCRIES and other factors. (5) Green: DOF figure is lower than client's figure, Red: DOF figure is higher than client's figure Comprehensive Report with Assessment Recommendations

| EXPENSE ITEM | ACTUAL | ADJUSTED | PSF | PER UNIT |
|---|---|---|---|---|
| REPAIRS | | | | |
| INSURANCE | | | | |
| PAINTING | | | | |
| WATER | | | | |
| MAGMT | | | | |
| WAGES | | | | |
| CLEANING | | | | |
| FUEL | | | | |
| LIGHT | | | | |
| MISC | | | | |
| TOTAL EXPENSES | | | | |

FIG 12A

| INCOME ITEMS | ACTUAL | ADJUSTED | PSF | PER UNIT |
|---|---|---|---|---|
| STORE INCOME | | | | |
| APARTMENT INCOME | | | | |
| MISC. INCOME | | | | |
| TOTAL INCOME | | | | |

FIG 12B

| BoroExpenseLevel | | Expense | Div | 10 P-ctile | 20 P-ctile | 30 P-ctile | 40 P-ctile | 50 P-ctile | 60 P-ctile | 70 P-ctile | 80 P-ctile | 90 P-ctile | 100 P-ctile | Avg |
|---|---|---|---|---|---|---|---|---|---|---|---|---|---|---|
| Manhattan Residential-Elevator | | Fuel | psf | $0.34 | $0.43 | $0.50 | $0.55 | $0.63 | $0.71 | $0.82 | $0.96 | $1.19 | $5.49 | $0.72 |
| Bldg Counts: | Total Count 1805 | Avg Num Units 80 | | 21 - 50 736 | | 51-100 474 | >100 341 | | | | | | | |
| Manhattan Residential-Elevator | | Light & Power | psf | $0.15 | $0.18 | $0.21 | $0.24 | $0.27 | $0.32 | $0.40 | $0.56 | $0.93 | $7.72 | $0.43 |
| Bldg Counts: | Total Count 1918 | Avg Num Units 81 | | 21 - 50 780 | | 51-100 493 | >100 371 | | | | | | | |
| Manhattan Residential-Elevator | | Wages | psf | $0.27 | $0.44 | $0.59 | $0.77 | $1.04 | $1.38 | $1.86 | $2.50 | $3.45 | $22.56 | $1.56 |
| Bldg Counts: | Total Count 1780 | Avg Num Units 86 | | 21 - 50 728 | | 51-100 488 | >100 372 | | | | | | | |
| Manhattan Residential-Elevator | | Repairs | pct | 3.1% | 4.4% | 5.8% | 7.2% | 8.8% | 10.4% | 12.8% | 15.9% | 21.0% | 2100.0% | 13.8% |
| Bldg Counts: | Total Count 1983 | Avg Num Units 80 | | 21 - 50 806 | | 51-100 502 | >100 372 | | | | | | | |
| Manhattan Residential-Elevator | | Repairs | psf | $0.50 | $0.66 | $0.85 | $1.03 | $1.20 | $1.45 | $1.77 | $2.19 | $2.85 | $13.70 | $1.57 |
| Bldg Counts: | Total Count 1983 | Avg Num Units 80 | | 21 - 50 806 | | 51-100 502 | >100 372 | | | | | | | |
| Manhattan Residential-Elevator | | Management | pct | 3.1% | 4.5% | 5.1% | 5.9% | 6.1% | 6.6% | 7.3% | 8.6% | 10.8% | 862.2% | 8.3% |
| Bldg Counts: | Total Count 1893 | Avg Num Units 81 | | 21 - 50 782 | | 51-100 486 | >100 360 | | | | | | | |
| Manhattan Residential-Elevator | | Insurance | psf | $0.12 | $0.15 | $0.19 | $0.22 | $0.26 | $0.30 | $0.35 | $0.45 | $0.62 | $5.30 | $0.33 |
| Bldg Counts: | Total Count 1964 | Avg Num Units 80 | | 21 - 50 794 | | 51-100 497 | >100 371 | | | | | | | |
| Manhattan Residential-Elevator | | Insurance | pU | $112 | $150 | $187 | $220 | $255 | $298 | $349 | $438 | $624 | $3,194 | $336 |
| Bldg Counts: | Total Count 1964 | Avg Num Units 80 | | 21 - 50 794 | | 51-100 497 | >100 371 | | | | | | | |
| Manhattan Residential-Elevator | | Water & Sewer | pU | $172 | $250 | $320 | $341 | $362 | $382 | $417 | $466 | $640 | $5,362 | $409 |
| Bldg Counts: | Total Count 1895 | Avg Num Units 81 | | 21 - 50 777 | | 51-100 480 | >100 366 | | | | | | | |
| Manhattan Residential-Elevator | | Painting | psf | $0.04 | $0.08 | $0.12 | $0.15 | $0.20 | $0.24 | $0.30 | $0.40 | $0.58 | $6.86 | $0.28 |
| Bldg Counts: | Total Count 1210 | Avg Num Units 93 | | 21 - 50 471 | | 51-100 331 | >100 282 | | | | | | | |
| Manhattan Residential-Elevator | | Miscellaneous | pct | 0.6% | 1.3% | 1.9% | 2.6% | 3.5% | 4.5% | 6.0% | 8.1% | 13.1% | 6374.2% | 10.6% |

Figure 13

COMPUTERIZED SYSTEM AND METHOD FOR ACQUIRING AND ANALYZING DATA PERTAINING TO REAL ESTATE

This application is a continuation-in-part of co-pending application titled COMPUTERIZED SYSTEM AND METHOD FOR ACQUIRING AND ANALYZING DATA PERTAINING TO REAL ESTATE bearing Ser. No. 09/947,897 filed Sep. 6, 2001 which is incorporated herein and Applicant claims priority therefrom.

BACKGROUND OF THE INVENTION

This invention relates to the acquisition and analysis of data pertaining to real estate. In particular, this invention relates to the acquisition and analysis of data pertaining to real estate assessments and to the income and expense streams of selected properties, and to reporting the results of the analysis.

Owners and managers of real estate buildings are often faced with a problem of determining whether the income and/or the expenses from their building is in line with like buildings. Owners/managers are also faced with the problem of determining whether certain expenses are excessive and whether the income from their property is adequate. These owners/managers are also faced with the payment of taxes and other assessments levied against their buildings. Assessment practices and policies are directly linked to the income and expenses of a selected property relative to certain norms and the owners of the property may be faced with potentially erroneous real property taxes and assessments, which they have to pay. Owners/managers have a problem determining whether these charges are out of line compared to like structures and whether or not to appeal them. Owners/managers of properties are also faced with the problem of paying local property and/or state and federal income taxes on the property and maintaining records. Potential purchasers of a property (e.g., investors) are also faced with the problem of ascertaining how the property compares with other properties with respect, among others, to assessments and the historical income and expense (I&E) stream to determine the value of the property.

SUMMARY OF THE INVENTION

Applicant's invention resides, in part, in the recognition that a substantial amount of information pertaining to the buildings in an area is available from public and private sources and that this information can be inputted into a computerized data base programmed to produce statistical standards (norms) which can then serve as a basis for subsequent comparison with particular, selected, structures. Applicant's invention also resides in organizing and formatting information inputted into the computerized data base, including information pertaining to selected structures, to facilitate the analysis of various income and expense items (including the taxes) pertaining to selected structures. This includes arrangements which enable the efficient comparison of various structures regarding their income and expenses and for the generation of reports for local property and/or income tax purposes, assessments determination, management purposes and/or investment decisions.

Applicant's invention also resides, in part, in the use of various special screens (forms) to aid in entering data pertaining to selected buildings and portfolios of buildings into a computerized data base and to interactively assist in the analysis of the data entered in view of the information contained in the computerized data base including the generation and display of significant statistical information regarding the selected properties and the generation of various reports.

Applicant's invention also resides in organizing data pertaining to a building according to certain formats and developing corresponding norms. For example, various expense and income items may be calculated on a per unit base (e.g., the number of apartments in a building), or as a percentage of the income derived from that building; or on a per unit area (e.g., per square foot) basis. Thus, in a method embodying the invention, the value of a particular building may be determined by inputting into a data base selected physical attributes of the building and selected income and expenses pertaining to the building. The data base may be programmed to calculate selected expenses and income on a per unit area basis and/or on a per unit basis and/or on percent of income basis. The data base is further programmed to compare the particular building versus other similar buildings and/or an average of similar buildings for which data is stored in the data base.

Applicant's invention also resides in processing data to generate multi section reports which offer insight into the operation of properties, their expenses and assessments. These reports are thus generally beneficial to the owner/user/manager/investor of the properties. These reports include ones which visually display how the income and expense (I&E) stream of selected buildings (or portions thereof) compare to developed norms. A review of some extraordinary expenses and income, may highlight problems and assist in the correction of the situation. Other reports, or sections thereof, include information to generate an appeal of assessments, or are directed to a taxing authority or to governmental agencies and include pre-programmed descriptive phrases highlighting certain features and points of the report.

BRIEF DESCRIPTION OF THE DRAWINGS

In the accompanying drawings like reference characters denote like components.

FIGS. 3A, 3B and 3C are illustrative data entry screens suitable for use in practicing the invention;

FIG. 4 is an illustrative income and expense (I&E) screen suitable for use in practicing the invention; FIG. 4A1 is an illustration of the RPIE Detail and "Move To" command of FIG. 4;

FIG. 4A2 illustrates various I & E screen commands;

FIGS. 4B1 and 4B2 illustrate the handling of capital repairs in accordance with the invention;

FIG. 4C1 is a detail of a portion of FIG. 4;

FIG. 5 depicts a client review screen embodying the invention;

FIGS. 5A, 5B and 5C are detailed portions of FIG. 5;

FIG. 6 is an Appeals screen embodying the invention;

FIGS. 6A, and 6B are detailed portions of FIG. 6;

FIG. 7 is a multi year analysis screen embodying the invention;

FIG. 8 is a diagram of a Co-op I&E analysis screen embodying the invention;

FIG. 10 depicts a "COMPS SCREEN";

Figure 10:
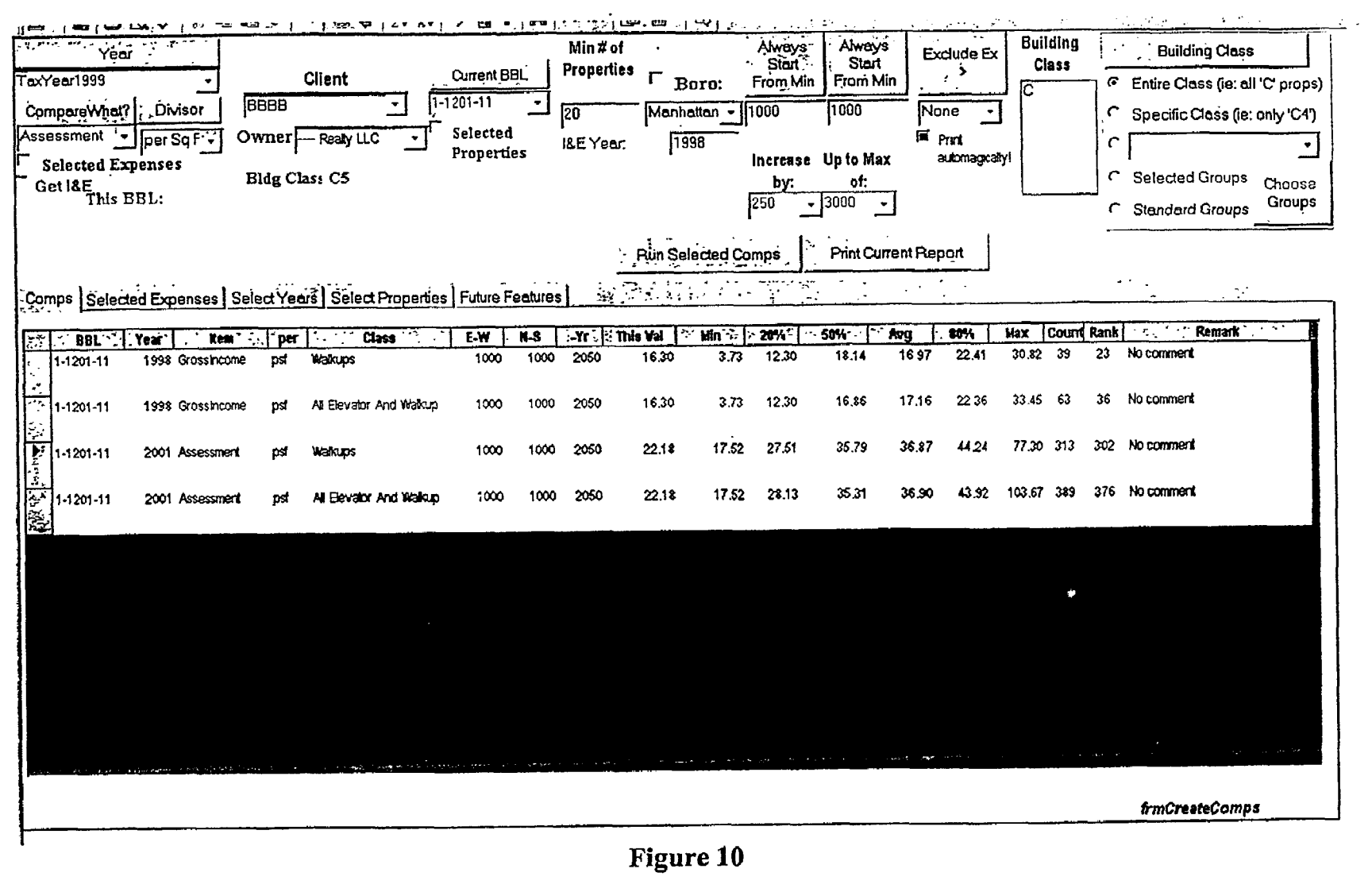

FIGS. 10A, 10B, 10C, 10D and 10E are bar graphs providing comparative analysis of expenses for sample properties;

FIGS. 10F and 10G are bar graphs depicting an analysis of comparative assessments and Income and Expenses, respectively; FIG. 11 is an illustrative Assessment Recommendations report for a client;

FIG. 12 is another Appeals screen embodying the invention;

FIGS. 12A and 12B are detailed portions of FIG. 12; and

FIG. 13 is table of information for use with the invention.

DETAILED DESCRIPTION OF THE INVENTION

In accordance with one aspect of the invention, information relating to a large number of buildings within an area, or areas, of interest is obtained from many sources and is inputted into a computerized data base. The computerized data base is programmed to enable the analysis of the information in several different ways to produce various statistical standards (norms) regarding various income and expense items (including taxes and other assessments). Data pertaining to a selected building can then be inputted into the computerized data base and compared with the standards for buildings most like the selected building. The resultant analysis of the data for the selected building may serve many different purposes. For example, an owner/manager of the selected building may use the resultant analysis to see how the income and expenses of the building compare to those of like buildings, thereby revealing whether any problems exist requiring attention. In addition, the resultant analysis provides the owner/manager with information to determine whether to file an appeal to obtain a reduction of the taxes levied against the property. Furthermore, the resultant analysis may be used by the owner/manager to provide specialized reports to taxing authorities and/or to governmental agencies, as and when needed. Still further, the resultant analysis may be used by an investor or for an investor to evaluate the status and value of the property.

Figure 1:
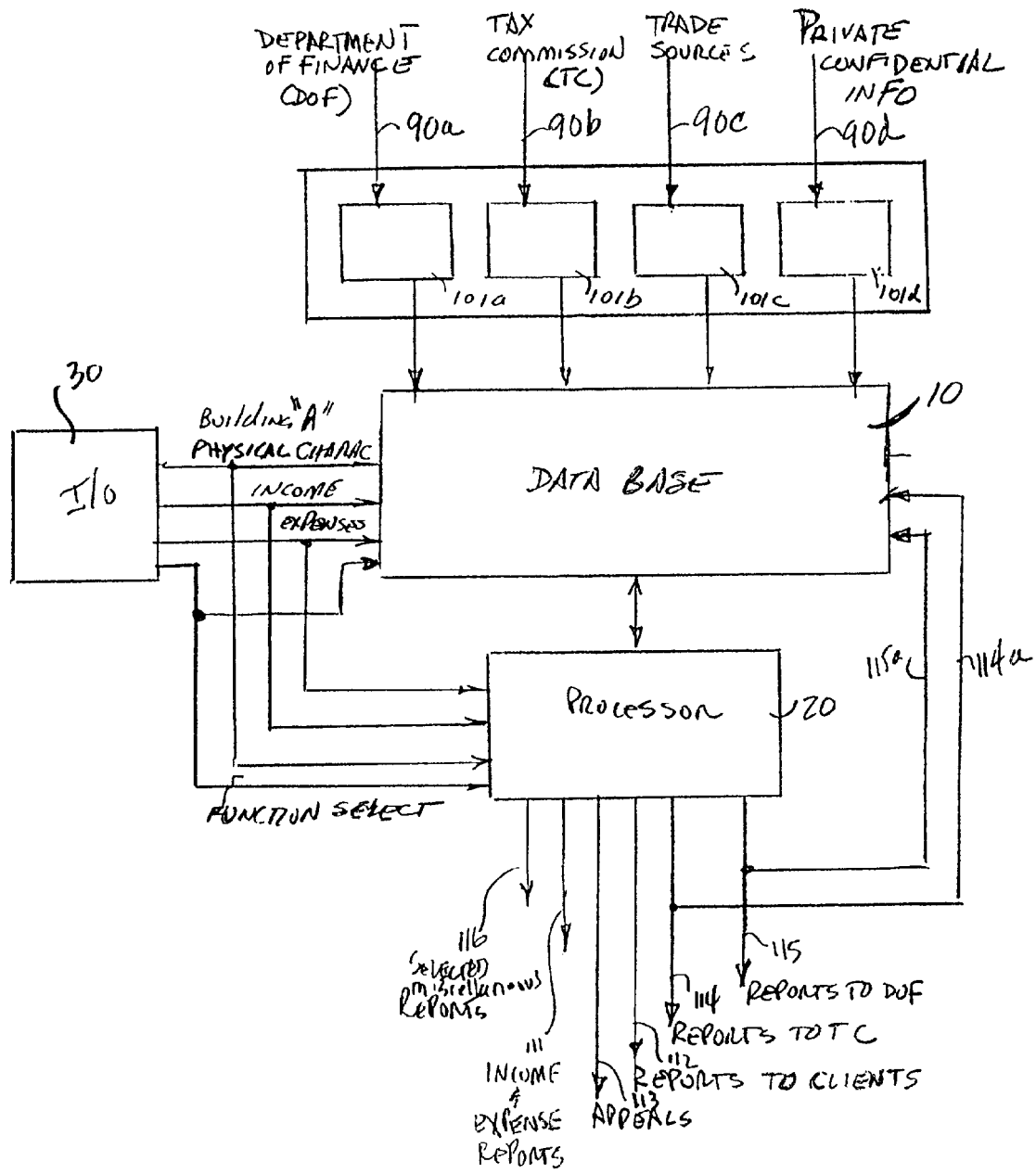
FIG. 1 is a block diagram of a system embodying the invention.
Figure 2:
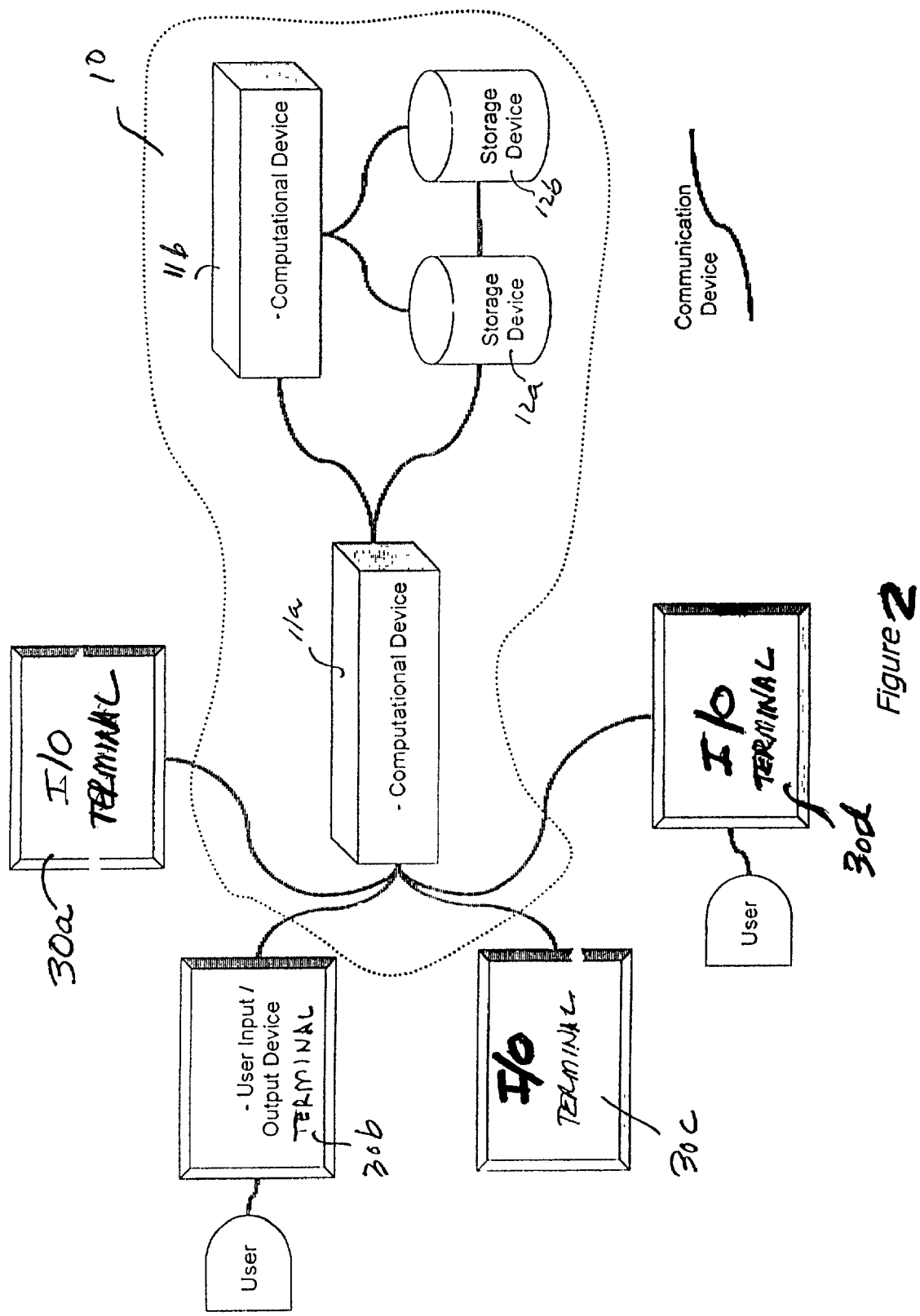
FIG. 2 is a block diagram illustrative of a computing and storage system for use in practicing the invention.

Apparatus for practicing the invention includes a data storage and computation system 10 in which is stored relevant data pertaining to a large number of buildings. As shown in FIG. 1, publicly available data (90*a*, 90*b*, 90*c*) and privately obtained information (90*d*), which may be confidential, is input into a data base 10 for initial data collection and processing. The data base 10, as shown in FIG. 2, includes computational (11*a*, 11*b*) and storage devices (12*a*, 12*b*) which may be accessed via any number of different terminals and input/output (I/O) devices (30*a*, 30*b*, 30*c*, 30*d*). The information obtained from the data base 10, or inputted into the system, may be displayed on any appropriate terminal. The computation and storage device 10 shown in FIG. 2 may in fact be contained in one or more computers linked together and which may be selectively accessed by users (clients or analysts) and/or programmers. To provide a degree of efficiency and to ease the processing of information and to ensure that the information is presented in a suitable manner, information may be inputted into, or obtained from, the data base 10 via a number of special screens (forms), discussed below. This allows for pre-programming of the computer base and for interactive operation of the system.

Referring to FIG. 1, note that publicly available data from governmental or quasi-governmental sources may be inputted into the data storage and computation system 10. By way of example, information from a governmental agency, such as the Department of Finance (DOF), of a city (e.g., New York City) is inputted into data base 10 via an input-output (I/O) device 101*a* and information from another governmental agency, e.g., the Tax Commission (TC), of the city may be inputted via an I/O device 101*b* into the data base. Information from trade sources and the like may be inputted into data base 10 via an I/O device 101*c*. Information available from private and/or confidential sources including data available to a user (or a client) from its own accumulated data base may also be inputted into the data base 10 via an I/O device 101*d*, or any appropriate terminal. As further detailed below, in systems embodying the invention, information inputted into the system for purpose of obtaining a comparison with existing data may itself become part of the data base for subsequent use.

The data inputted into the data base 10 from numerous different sources may come in many different forms. By way of example, publicly available information obtained from the Department of Finance (DOF) may differ in format and substance from the information obtained from the Tax Commission (TC).

A—For example, the DOF data may include:
(a) Assessments;
(b) Exemptions;
(c) Abatements; and
(d) Physical data about the building
   i—year built;
   ii—number of stories;
   iii—square feet of land;
   iv—square feet of building;
   v—number of units; and
   vi—building class.

B—Tax Commission (TC) data includes large amounts of data pertaining to income and expense data submitted by a property owner regarding that property. The expenses submitted pertaining to a particular property may include:
   i—taxes;
   ii—water and sewer;
   iii—fuel;
   iv—light;
   v—cleaning;
   vi—wages;
   vii—repairs;
   viii—management fees;
   ix—advertising;
   x—painting;
   xi—leasing; and
   xii—miscellaneous (which may include legal and accounting expenses and other miscellaneous expenses).

Note that for a city, such as New York City, a large amount of TC and DOF data is available going back many years. This data, as well as all other available data inputted into the data base 10, enables the development of statistical norms within various categories against which individual properties can be compared. Note also, that by programming the processor 20 the large amount of data may be reformatted into several different forms and then organized to enable the subsequent comparison with particular (selected) structures for the generation of analyses and reports having certain desired features.

Referring to FIG. 1, note that information pertaining to a selected building may be inputted into the system or obtained from the system via any I/O device such as I/O 30. By way of example, an I/O device 30 can supply information and commands to data base 10 and to processor 20 and may also be used to obtain information from the data base 10 and the processor 20. Thus, an I/O 30 may be used to supply information pertaining to the physical characteristics of a building (e.g., "Bldg. A") and its income and expenses into data base 10 and processor 20. I/O 30 can also supply a command (function select) to processor 20 and/or data base 10. As further detailed below, the system is programmed to analyze the stored and inputted data to produce specially formatted data suitable to produce several reports, including: a) income and expense (I & E) reports 111; b) client reports 112; c) appeals reports 113; d) reports to Tax Commission (TC) 114; e) reports to Department of Finance (DOF) 115; and f) selected miscellaneous reports 116. Selected information, such as the information and reports to the TC and DOF, may be fed back (e.g., via lines 114a, 115a) to the data base 10 to make permanent records available within the data base of all the corresponding information sent to any of these or similar agencies, as discussed below.

To further explain the invention, assume that a client/user wishes to consider, evaluate, assess, investigate, or examine a selected building. When a selected property is under consideration, the data base is accessed and searched via screens such as those shown in FIGS. 3A, 3B and 3C to retrieve (or enter) physical and other data pertaining to the building and the retrieved (or entered) data is compared with data provided by a client (user) to also update and correct the stored data, if necessary.

Figure 3B:
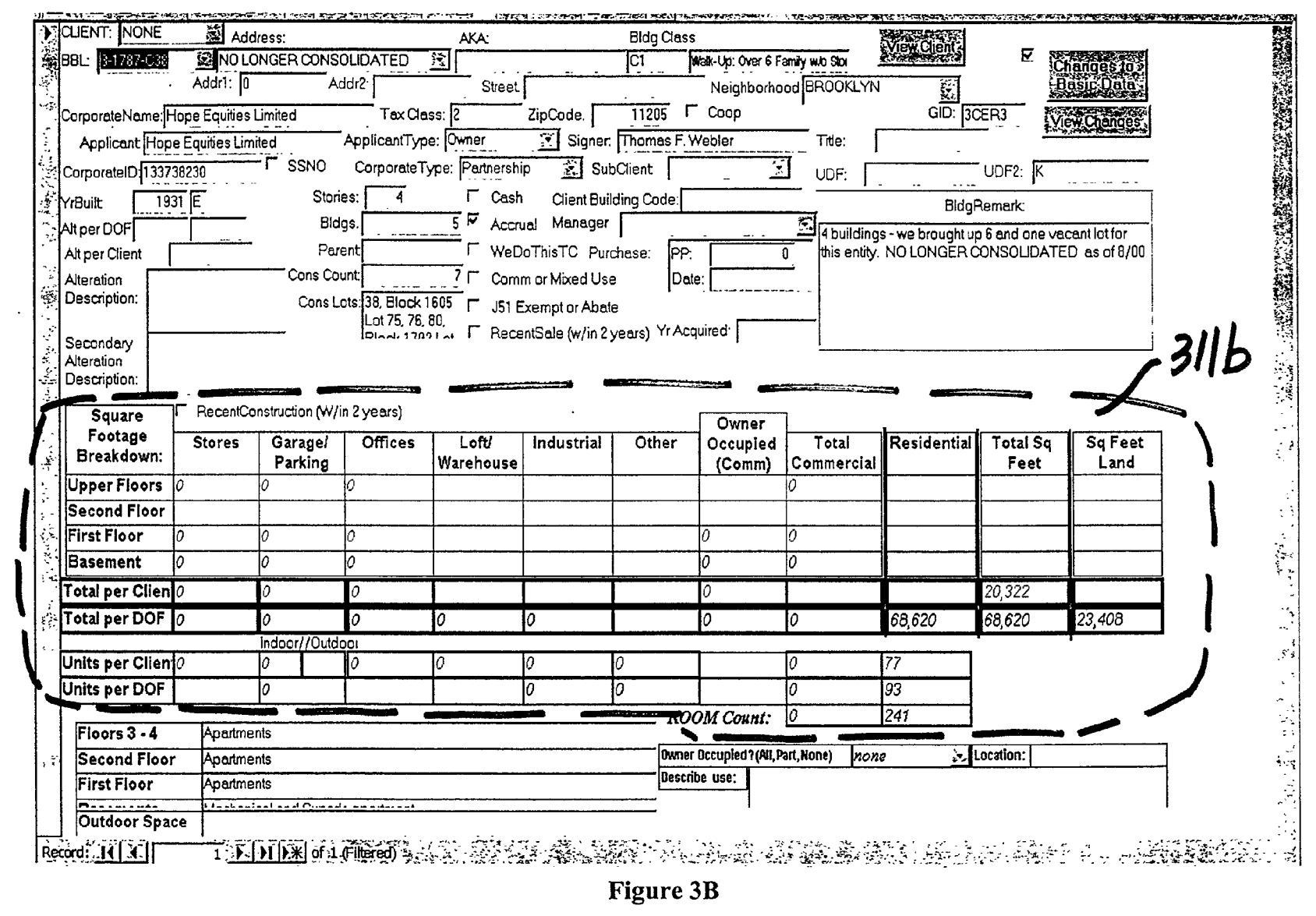

The user may initiate a LOOK-UP request (See FIG. 3A) by supplying the address of the selected building, or its borough, block and lot number (BBL), via an I/O device to the data base 10 with a request that all pertinent information stored in the data base relative to that building be retrieved. The request to retrieve stored information may be entered via screens of the type shown in FIGS. 3A or 3C. In addition to the retrieved information, the screens prompt the client/user to supply new and/or additional information in a prescribed sequence and manner. Stored information (which may have been obtained from the DOF or the TC, or any other source) is retrieved and compared with the latest client supplied information. In FIGS. 3A and 3B, there is included sections 311a and 311b (respectively) for: a) comparing unit count according to (per) DOF and unit count according to (per) client; and b) comparing the square footage of various portions of the building according to the client and according to the DOF. Based on the comparison(s), the retrieved information (or the supplied information) is updated or corrected and new data is fed back to the data base. As shown in FIG. 3C, a screen with a section 313 may be used by, and in, the system to track information pertaining to assessment valuation for past, current and coming years.

As discussed above and as discussed below, each screen includes some, if not all, of the following property identifying information:

1—LOOK UP: BBL, BORO, ADDRESS
2—CLIENT AND ADDRESS INFO
3—ASSESSED VALUATION (AV); AV PER SQuARE FT; BLDG CLASS;
4—BRIEF DESCRIPTION OF BLDG-# OF STORIES; # OF ROOMS;
5—TAX COMMISION DATA;
6—COMMERCIAL OR MIXED USE;
7—UNIT COUNT PER DOF AND PER CLIENT;
8—SQUARE FOOTAGE PER DOF AND PER CLIENT;
9—PURCHASE DATE; PURCHASE PRICE; CLIENT BLDG CODE.

Income and Expenses (I&E) Screen

Figure 4:
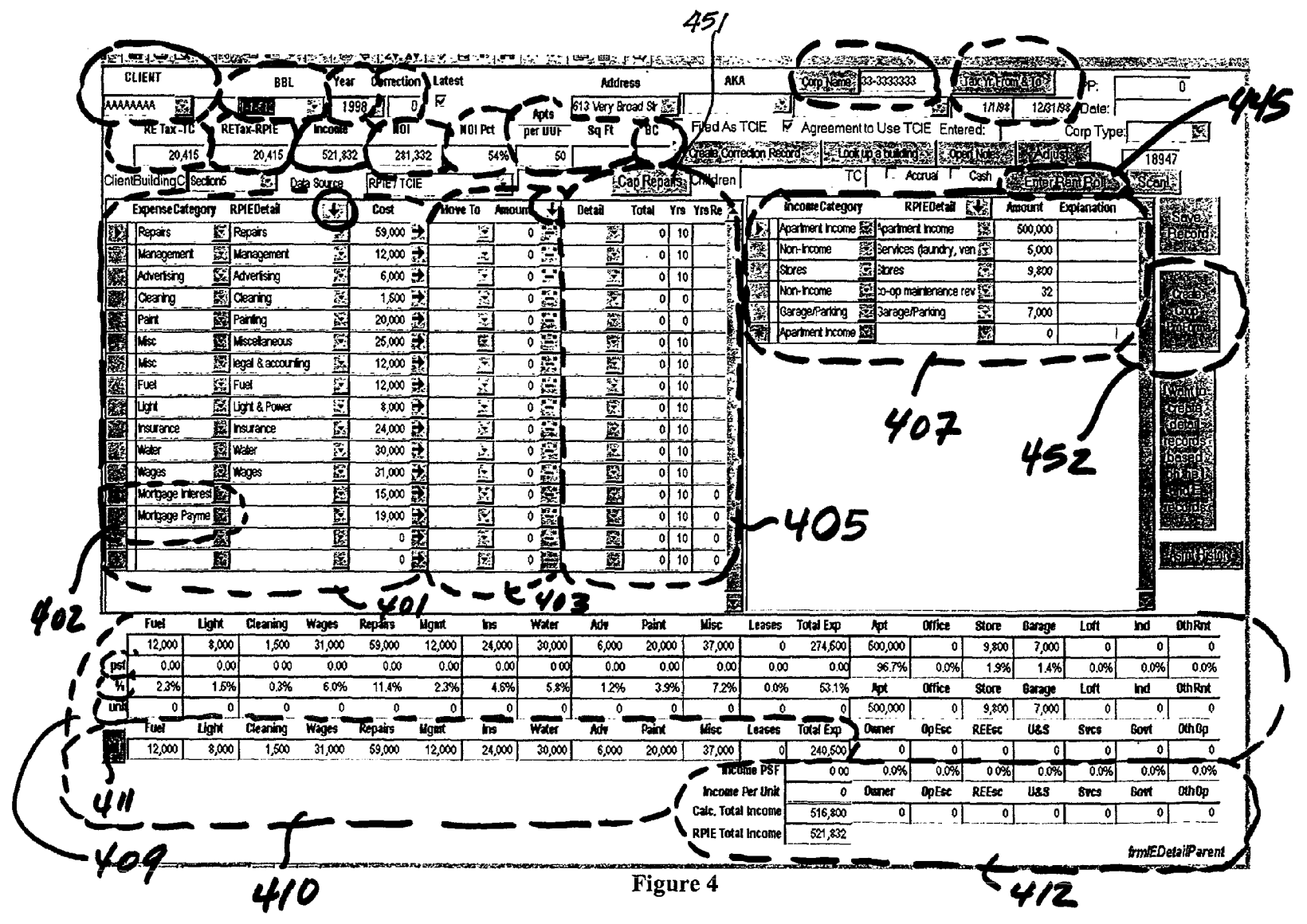

The user/client may input pertinent "physical" and "income and expense" information into the data base 10 via an Income and Expense (I &E) screen of the type shown in FIG. 4. The information may include retrieved data available from any source (e.g., the TC) which may include income and expense (I&E) data for several years, particularly when the owners of those properties have previously filed an appeal with the TC. When that information is not available, or for greater accuracy, data obtained from the owner of the property may be entered onto (and via) the I&E screen. The processing of the income and expense items and the use of an I&E screen of the type shown in FIG. 4, is a significant aspect of the invention, as discussed below. The screen (form) includes boxes for the entry of: (1) client name; (2) borough, block and lot number (BBL); (3) the year of interest; (4) correction status; (5) address of the property in question; (6) alternate address name (AKA), and corporate name; (7) real estate taxes according to the TC, and the Real Property and Income & Expense Statement (RPIE) from the DOF; (8) income; (9) NOI—net operating income which is equal to gross income minus total expenses; (10) NOI pct—the percentage of the income retained as NOI; (11) the number of units (e.g., apartments) according to the governmental agency (e.g., DOF); (12) the building class (BC); (13) a section 401 for entry of various expenses organized according to categories either defined by the client or per the RPIE and a corresponding Detail description (where RPIE is the detailed format dictated by a government agency for reporting expenses); (14) a section 403 including columnar entries titled "Move To" and "Amount" to move expenses (or part of the expenses) from one category to another category; (15) a section 405 for tracking Capital Repairs which include columns titled "Detail" (e.g., the items which are the subject of the capital repair), "Total" (cost of the repair), "Yrs" (i.e., the number of years over which the corresponding item is to be amortized) and YrsR (i.e., the number of years remaining for the item to be amortized); (16) a section 407 for tracking income by categories; (17) a section 409 for tabulating the various expenses and the cost of the various expense items on either: a) a per square foot basis (psf); b) a % of income basis; and/or c) a per unit basis; (18) a section 410 which includes a control button 411 which functions to "Save To RPIE". When control button 411 is activated the system is programmed to take all the detailed information entered in sections 401 and 407 (and sections 403 and 405, if applicable) and to sum up the amounts for the different expense and income categories and to also produce the total income, the total expenses, the NOI, and NOI pct and insert (record) these items within the screen as shown in FIG. 4; and (19) a section 412 which includes a tabulation of various income items including per sq. ft. basis and per unit basis.

The Income and Expense (I&E) screen (form) shown in FIG. 4, as well as the other screens discussed above and to be further discussed below, assist in an interactive system in which pertinent data is made available to the user who can then update (alter) and then use and/or save the updated/altered information. With respect to FIG. 4, note the following:

1—some basic building data are either already present in the system and displayed on the screen, or if not already entered, are entered. The basic data includes: client identification (ID) and building ID; taxes/assessments; income; net operating income (NOI) and NOI as a percentage of income; number of units; square footage; and building class;

2—provision is made for entering various income and expense items (e.g., in sections 407 and 401, respectively) for a particular building.

(i) With respect to the expense items the following, and any breakdown thereof, or any capitalized expense in one of the following categories may be included:
- a—fuel
- b—light
- c—cleaning
- d—wages
- e—repairs
- f—management
- g—insurance
- h—water
- i—advertising
- j—painting
- k—miscellaneous (ii) Provision may also be made in a section 402 in the I & E screen for entering information pertaining to the amount paid to amortize a mortgage and the total amount of the mortgage payment for interest and principal. This information pertaining to the debt burden of the structure, while not needed for RPIE Reports, may be used to generate income tax and financial reports indicative of the actual cash flow and the profit and loss for the building.

(iii) with respect to income, the income can also be broken down into various categories such as, for example, store income, office income, loft income, parking, services (laundry), operating escalation income, etc.

3. As shown in section 409 of FIG. 4, the data base is programmed such that the information entered into the data base can be used to calculate the various costs (expenses) on: (a) a per unit area basis (e.g. per square foot—psf (b) a per unit basis, where "unit" typically refers to the number of apartments in the building (but may be any other subdivision, e.g., a room); and/or (c) as a percentage of the building's income. Thus, the I&E form tabulates various expense items and/or income items on a per square foot basis, and/or on per unit basis, and/or, for the expenses, on a percent of income basis. These calculations facilitate the analysis as to whether expenses are in proper alignment with the expenses and income for like buildings.

4—The income and expense items are processed and formatted to enable a user to use the resultant information to prepare any number of reports needed for governmental authorities or for personal, owner related purposes. These include, for example:

(a) department of finance (DOF) Real Property Income and Expense statement (RPIE);

(b) Tax commission income and expense (TCIE) report;

(c) appropriate tax return (e.g., corporate, individual or the like); or (d) an accountant—s statement.

5. In a particular embodiment, a program associated with the entry of data on the I&E screen, includes "prompts" which automatically suggest the next category in a sequence meeting the order of the RPIE. However, a user may change the order of the entry of the data to best suit the needs and preferences of the user.

6. In fact, the data entry is programmed such that whenever a user types the first one or two letters in either the general category or the sub group category the closest choices are brought up, until the correct item appears, thus reducing the amount of typing.

7. A user may introduce a sub-category (e.g., gas or electric) which is not on file in the RPIE detail column. The system is programmed to provide prompts to enable a user to introduce a new category or to correct an entry to an existing one. In any event, the user can verify whether the newly added sub-category is valid (e.g., whether it is an acceptable category for RPIE) and should be added, or whether it is an error. If it is the latter, a correction may be made to the entry.

8. Regarding the income and expenses, any one of a number of individual items can be entered for each category. Each screen (form) is programmed to provide a total while still allowing a user to see detailed information. For example, many reports show detailed repair expenses, even though only one total number is reported on the RPIE form. It is often desirable for purpose of analysis to retain the information that a particular category exceeds certain levels.

9. Sometimes it is advantageous and proper to shift certain items from one category to another. For example, a user's accountant may list painting supplies under "repairs", while for purpose of the RPIE they more properly belong in the "Paint" category. Accordingly, a section 403 is provided which enables the entered data to be programmed to allow a user by means of the "Move To" and "Amount" commands to specify an amount to be shifted from one category to another, and that amount is moved to a specified "new category". But, the data base is programmed to keep a record of what was shifted. This is commonly known as "audit trail". Tracking information is a significant aspect of this invention. For example as shown for section 401 and 403 in FIG.4A1, for purpose of reporting to a governmental agency (e.g., RPIE) the cost of repairing appliances is listed as a Repair Expense item while, for another report, e.g., a financial statement, it may be listed as a miscellaneous Expense item.

As detailed in FIG. 4A2, section 401 has a control button 414 and a set of control buttons 415. Section 403 has a control button 416 and section 407 has a control button 417. Control button 414 functions to force a stop at each detailed entry in the RPIE Detail column. Control button 415 when activated moves ½ of the amount in the RPIE Detail column to a corresponding row in the Move To and Amount columns. Control button 416 functions to "hide" a portion of the screen pertaining to the Move To and Cap Repairs columns to give the user a clearer view the screen. Control button 417 provides a similar stop function on the income side as control 414 provides on the expense side.

Figures 4B1, 4B2:
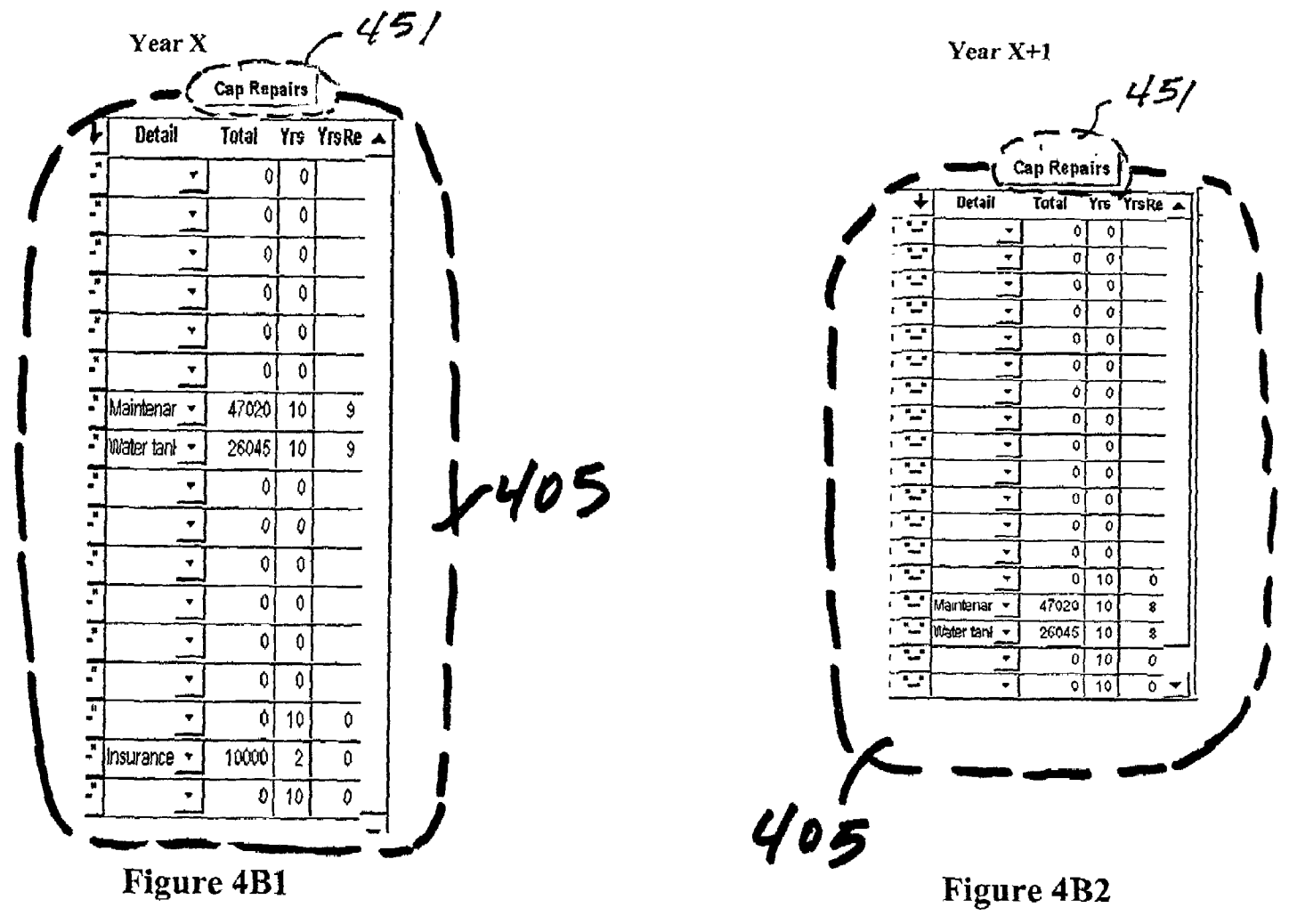

10. A section 405 is set up for entering and handling capital repairs (or any other specialized data): The columns labeled "Detail", "Total" and "Years" allow storage of detailed information about Capital Repairs, which may be amortized over a specified number of years, and the system is programmed to calculate the annual allocation of the total amount and notify the user/client in future years that these are former amortized amounts. The user/client can, at the push of a button, bring forward and revise the remaining amortization schedule. A significant aspect of the invention relates to the processing of the capital repairs information found in the I&E form. Referring to FIG. 4B1, for the year "X" (e.g., 2001) note that there is a record for: a) a maintenance item of $47,020.00 depreciable over a 10-year period, with 9 years remaining; b) a water tank item of $26,045.00 depreciable over a 10-year period with 9 years remaining; and c) an insurance item of $10,000.00 depreciable over two years with zero years remaining. FIG. 4B2 shows how the three foregoing items are programmed to be reported the following year X+1 (e.g., 2002). Activating the Cap Repairs button 451 automatically brings the amortized amounts forward, updating the records. Thus, for the year X+1, the maintenance and water tank items are shown with 8 years remaining. The insurance item is no longer shown since it had zero years remaining from the previous year.

Figure 4C1:
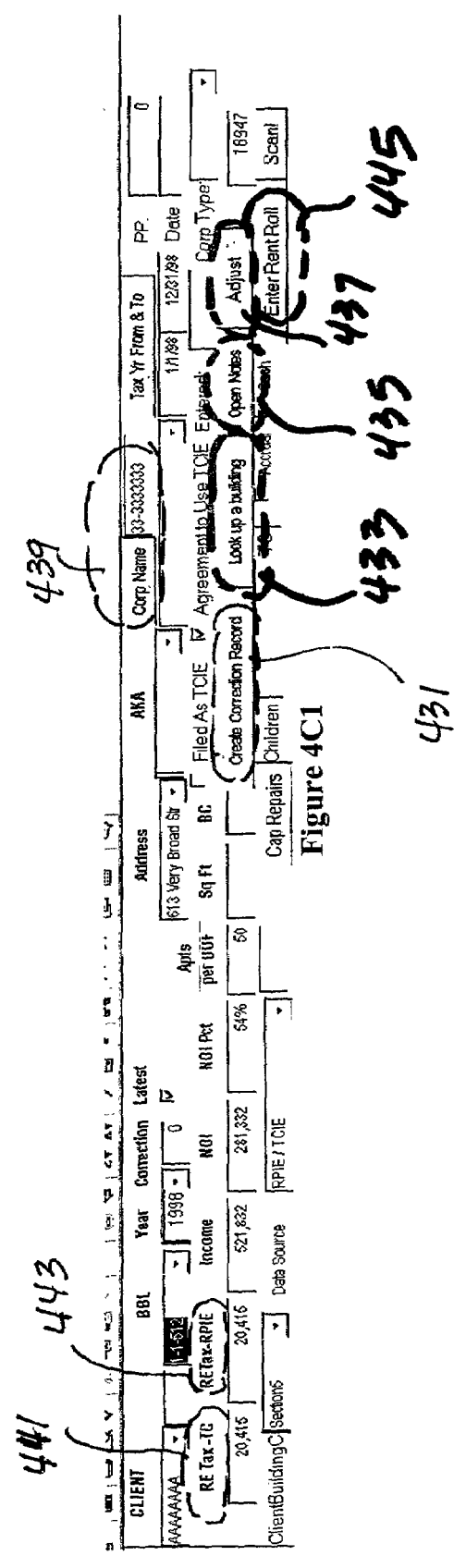

12. As detailed in FIG. 4C1, the I&E form also includes certain control functions: (1) Create a Correction; (2) Look up; (3) Open notes; (4) Adjust expenses; (5) Enter Rent Roll; (6) Save Record; (7) Create Co-op Pro Forma form; (8) create detail records; (9) Assessment History; and (10) Enter Rent Roll. These Controls perform various common functions, as described below:

a) Tax Yr From & To:—Enters default dates of January 1 and December 31 of current year.

b) Create a correction record control 431—If a change is made to a record after it has been submitted to a governmental agency, the "old" record is retained to maintain a file and record of what was given to the governmental agency (e.g., the City). Thus, If an error is discovered after an I&E Form has been submitted to DOF and/or TC, a new record is created which is a copy of the "old" record, to allow the user to make the necessary corrections. Note: Once a record has been submitted to TC or DOF, it is locked. If the user needs to change something, the user has to create a correction record as discussed above. Note also that in systems embodying the invention an audit trail is kept of what data is shifted from one category to another and a record of all information submitted is kept to enable subsequent comparison with any changed records.

c) Look up a building control 433—If the format provided by a client does not list borough, block and lot, only a corporate name or address, a lookup screen is provided for the user to locate the correct BBL (borough, block, lot). This look up screen is programmed to enable the location of a property by corporate name, address or by an alias (i.e., also known as or a/k/a) designation.

d) Open notes control 435:—Opens a separate screen for the user to make notes of unusual items, or thoughts to follow up.

e) Adjust expenses control 437:—This form enables a shift from any one expense category to any other expense category and from one form of presenting data to another. For example, data may be presented on a per square foot basis, per unit or as a percentage. The user can selectively select to make other changes to the caluclations. For example, the user can shift an amount from repairs to paints for each of a client's properties. Also, for example, the user may want to adjust all management fees for this building or for this client from one value (e.g., 6%) to another value (e.g., 8%).

f) Enter Rent Roll control 445 when activated opens a form enabling the user to enter the actual rent collected.

13. The system is programmed such that double-clicking the following fields performs various functions:

a) Double-clicking the corporate name (field 439) or ID will copy information from the last (previous) record.

b) Double-clicking the RE Tax-TC field 441 will calculate taxes based on the actual assessment and tax rates as specified by the Tax Commission (after exemptions).

c) Double-clicking the RE Tax-RPIE field 443 will calculate taxes based on the actual assessment and tax rates as specified by the Department of Finance (before exemptions).

14. Create Coop Pro-forma (field 452 in FIG. 4)—this control creates a record for a co-op, which is used to strategize an appeal, and is often different from the actual cash flow. This is another provision for entering and handling a specialized situation. Co-ops have a variation of the I&E screen, which tracks what was submitted to DOF or TC. The user can then create a "pro forma" I&E which allows calculation of what expected expenses might be for each category, according to City-wide statistics as adjusted by user-input based on experience and instinct. This facilitates submitting a case to the Assessor about a co-op, whose expenses are covered by common charges, but where the Assessment might be reduced by the "pro-forma" scenario.

Figure 5:
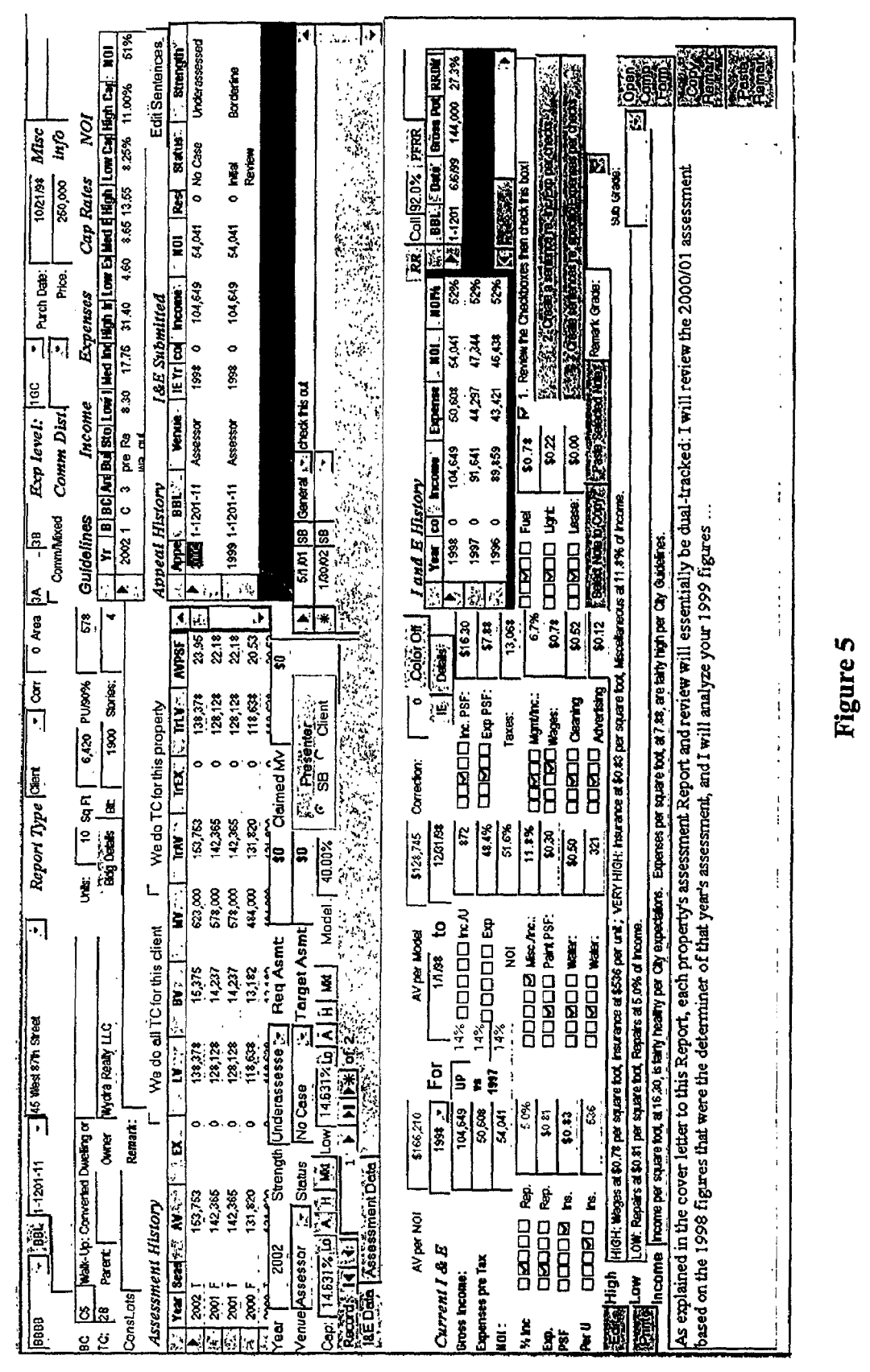
Figure 5A:
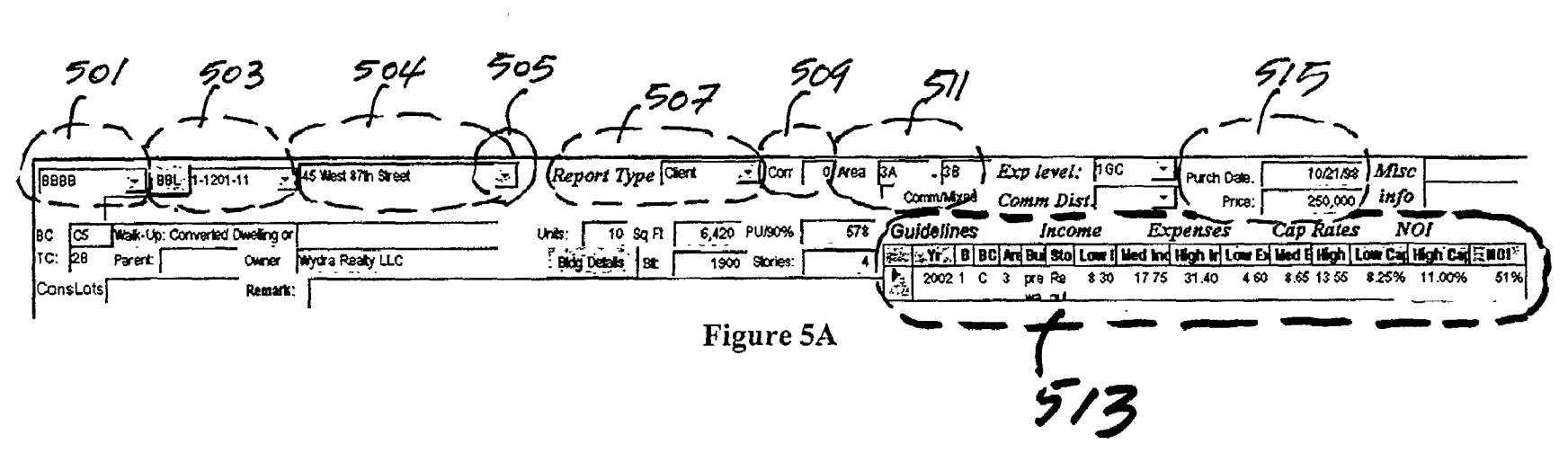
Figure 5B:
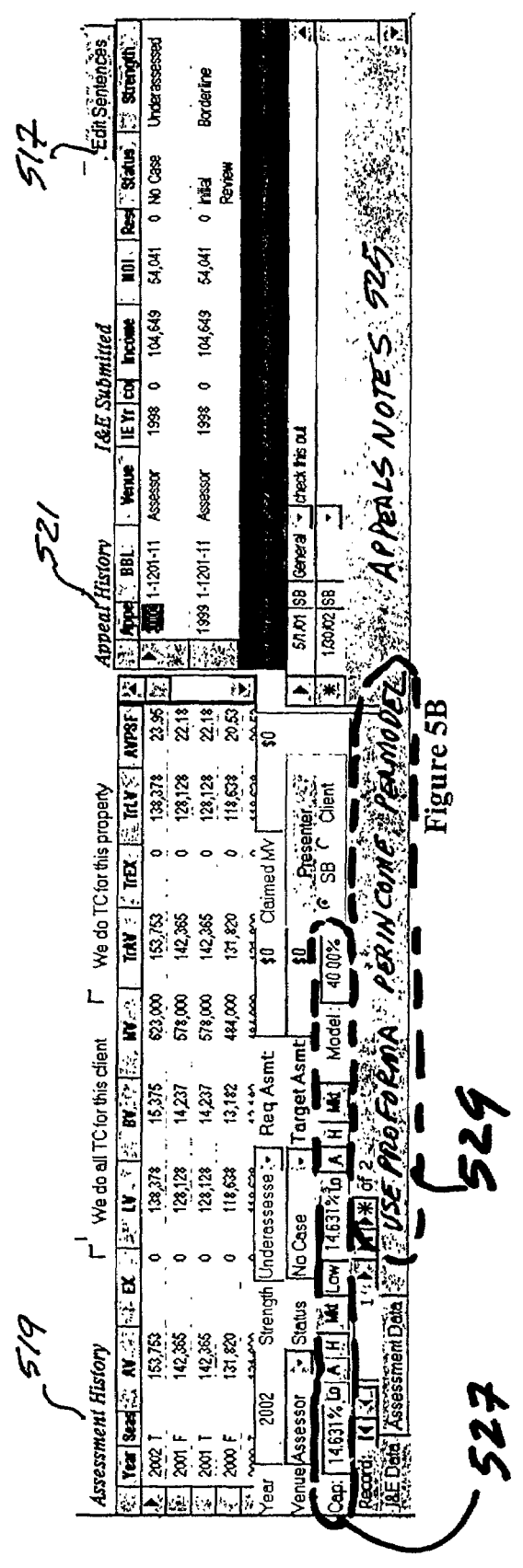
Figure 5C:
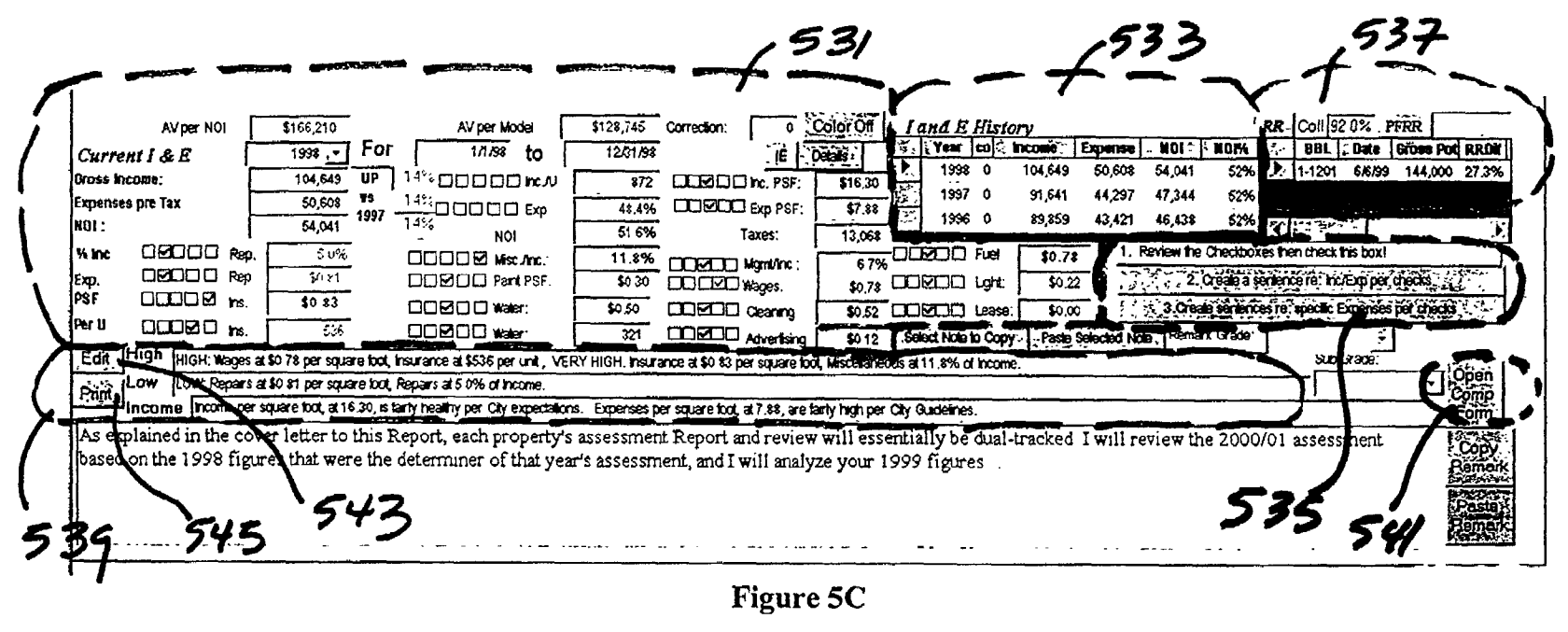

The Client Review Screen shown in FIG. 5, and as detailed in FIGS. 5A, 5B and 5C, includes the following features:

1—Client name box 501 is a drop-down box, allowing the user to select from known clients by typing a letter or two.

2—Building ID box 503 defines borough, block and lot of the building (clicking the BBL button will sort all the records in BBL order).

3—The user can right-click and choose to filter by client, so that the records shown will be only this particular client's properties.

4—Regardless of filtering by client, the drop-down for BBL will show a list of all properties for the currently selected client. However, if the client has not been filtered, the user has the option of choosing another client and then choosing one of that client's properties. The user can also select a property by typing into the address drop-down.

5—A red asterisked button 505 next to the address 504 alerts the user to changes in basic data—e.g. if the client, building class, or owner has been changed since the original data entry. Clicking the button opens a screen with details of what was changed and when. Note: Although not shown in the drawings, the screens include a color-coding scheme to alert and/or highlight the user/client to certain conditions.

6—"Report type" selector 507 causes report sentences to be generated differently for different clients and for different types of reports. For instance, co-ops have their own set of sentences. Properties of a particular client with an unusual set of circumstances may have their own set of sentences. For each record, the program will check certain criteria and select a likely report type, which the user has the option of changing.

7—"Corr"—correction box 509 indicates if more than one I&E was filed for a property. (The system can track an originally submitted I&E, and any corrections that were subsequently made.)

8—"Area Ratings" selector box 511 allows for fine-tuning the analysis of a property based on whether it is located in a very good, fair or poor area. The area ratings may be determined by a combination of desirability, quality of life, tenancy type, potential rent, etc.

9—Guidelines sections 513 are used to see where this property's I&E falls in comparison to the city's guidelines for that particular area and property type. The City guidelines may be looked up for Income and Expenses for the specific type of property. The City Guidelines also show the range of capitalization (cap) rates used by City assessors, and the expected Net Operating Income (NOI), which is used in several formulae.

10—"Purchase price and date" boxes 515 for the property are shown. Should the purchase price be greater than the city's market value, a red flag alerts the user to be very cautious with any presentation or appeal of existing assessments.

11—The "Edit Sentences" control button 517 (see FIG. 5B) allows a user to change the actual sentence phrases used to build the report, for a particular client or type of report.

12—Button J51, when available, allows the user to see detailed Tax Abatement and Exemption (i.e. also referred to as "J51"). The button is red if there is any data.

13—Assessment History section 519 (see FIG. 5B) lists the actual and transitional Tentative and Final Assessments for building, land and total, as well as exemptions, and Assessed Value per square foot.

14—The Appeals History section 521 (see FIG. 5B) shows previous appeal submissions, what I&E was submitted, and the result achieved.—The Client Review Screen enables the client to review any appeals filed to date (in condensed format), to create new appeals, and, most importantly, to evaluate I&E information for reporting purposes, and to create verbiage for the narrative of the report. [Note: There may be a "Client screen" which, as opposed to the "Client Review screen" of FIG. 5, is a screen used to track basic client data such as phone number and addresses.]

15—Current Appeal section 523 (see FIG. 5B) allows the analyst (user) to make a preliminary judgment of how to appeal a property where there are several different agencies and/or routes for appealing (Assessor, Change by Notice, Tax Commission, the default being none).

16—Appeal Notes section 525 (see FIG. 5B) allows the user to see all notes that have been made over time, and to add current comments and reminders.

17—Cap-L/A/H section 527 (see FIG. 5B)—Based on the borough, building class and the area rating selected by the user (see above), a set of cap rates may be pulled into the City Guidelines sub-form. The user can select a cap (capitalization) rate by clicking on L-low, A-average, or H-high, and the appropriate corresponding cap rate appears. The user can also select an alternate lower cap rate [Low L/A/H], which can be used to create an alternative calculation. Depending on whether the user feels that the true net operating income (NOI) of the subject property should be used or whether the user feels that an assessor will not be pleased with the true NOI and will use his statistical model, the cap rate that determines the Assessed Value (AV) may be applied to a chosen NOI, assuming the latest I&E, the Net Operating Income and selected cap rate are used to calculate the expected AV per NoI. The user can also propose a model NOI, which will result in an AV per model NOI. The analyst may select (see section 529 in FIG. 5B) from one or both of "use Pro forma per Income" and "Use Pro Forma per Model" in section 529 which in turn cause various explanatory appeal sentences to be generated. The Client Review Screen has an Assessment tab attached to it which allows the user to choose various combinations of income, expenses and cap rates (actual figures, guideline figures, or user-generated figures) to formulate possible ranges of assessment increases. The screen will show a comparison between each newly generated sample assessed value (AV) and the actual AV of the subject property. The user can then print an assessment range report for the client to review.

18—Current I&E section 531 (see FIG. 5C) shows the most current statement, with each expense analyzed per square foot, per unit or as a percent of Income, as selected. Those expenses that are much higher or lower than the norms developed may be highlighted (e.g., although not shown in the attached drawings, in practice they may be color coded in red, yellow or green to alert the user to consider them). Each expense (and income) item has a set of check boxes to indicate very low, low, normal, high or very high. These are initially checked by the program, as per the established norms. The user/analyst then has the discretion to change the selections.

19—I&E History section 533 (see FIG. 5C) shows the highlights of past I&E statements on file; Income, Expense, NOI, and NOI percentage.

20—Section 535 (see FIG. 5C) controls the generation of certain sentences and commands. Checking the box next to "1. Review the checkboxes, then check this box!" indicates that the user has made changes, so the program will not change the checkboxes the next time this record comes up. (If the user does not check this box, but hits #3, below, it will be automatically checked.) Clicking "2. Create a sentence re: Inc/Exp per checks" will cause sentences to be generated for a client report, based on how the boxes are checked, regarding overall expenses and income. Similarly, clicking "3. Create sentences re: specific Expenses per checks" will generate comments about the selected expenses.

21—A Rent Roll (RR) section 537 (see FIG. 5C) shows any rent roll data that has been entered, as well as how much each rent roll varies from the latest I&E on file. Clicking the RR button will open up a form for entering a rent roll. The user can also enter a collection rate, and clicking PFRR will generate a pro-forma Assessment (as under Appeals) based on Rent roll instead of Income.

22—High Expenses, Low Expenses, and Income section 539 (see FIG. 5C) shows the comments about each respective item as generated by the code. The user/analyst may add comments or delete portions as appropriate.

23—Open Comp Form section 541(see FIG. 5C) is a control function which allows the user to enter data about a comparison run on surrounding buildings. A program may be used to run the comparison automatically and enter it for possible inclusion in an appeal.

24—The Edit button 543 and the Print button 545 shown in FIG. 5C allow the user to see and edit the report being created in a full screen format or to print it out on paper.

Based on the information developed with the forms discussed above and other forms to be discussed below, various client reports are ready to be generated (see below under Reports).

Figure 6:
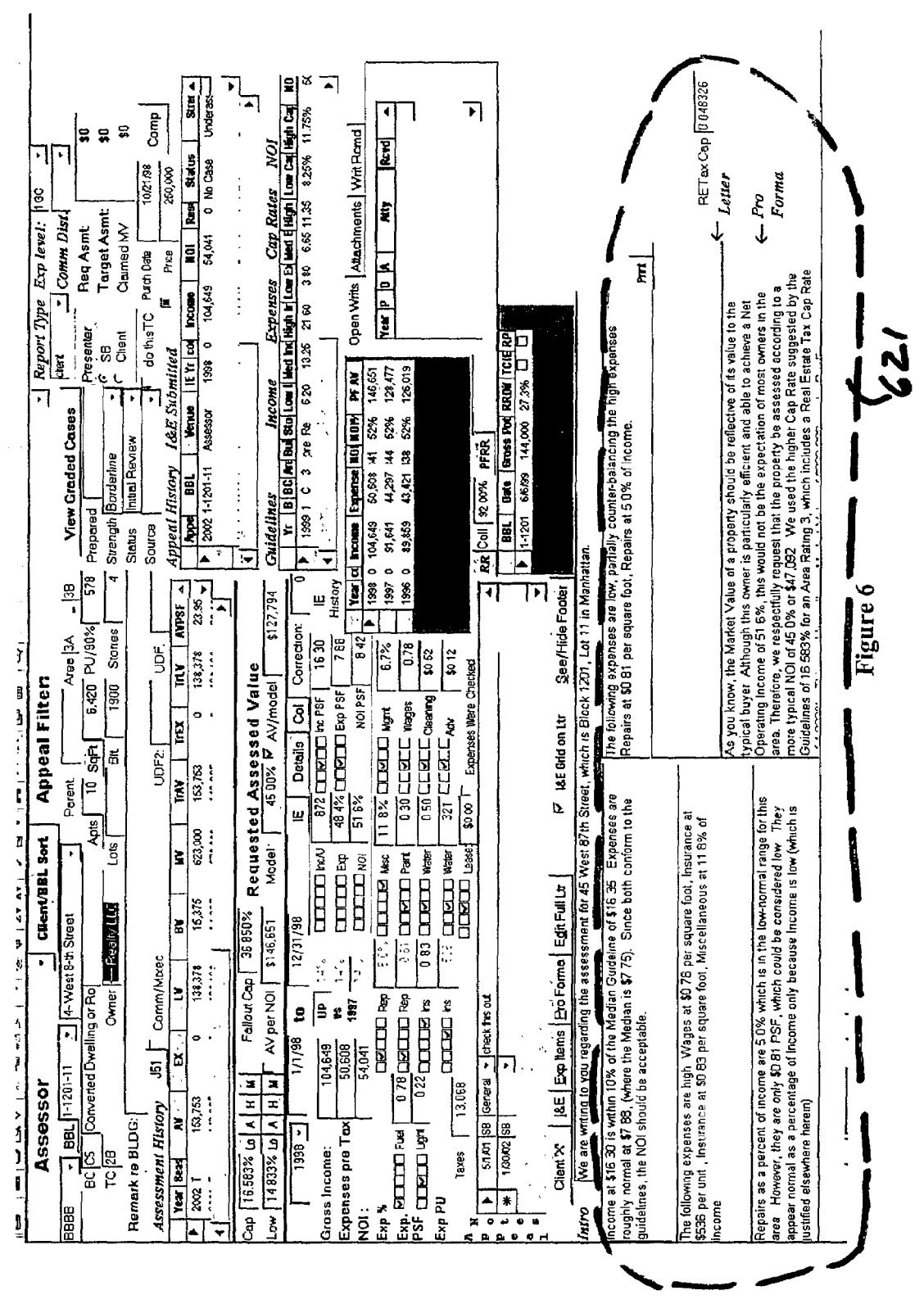
Figure 6A:
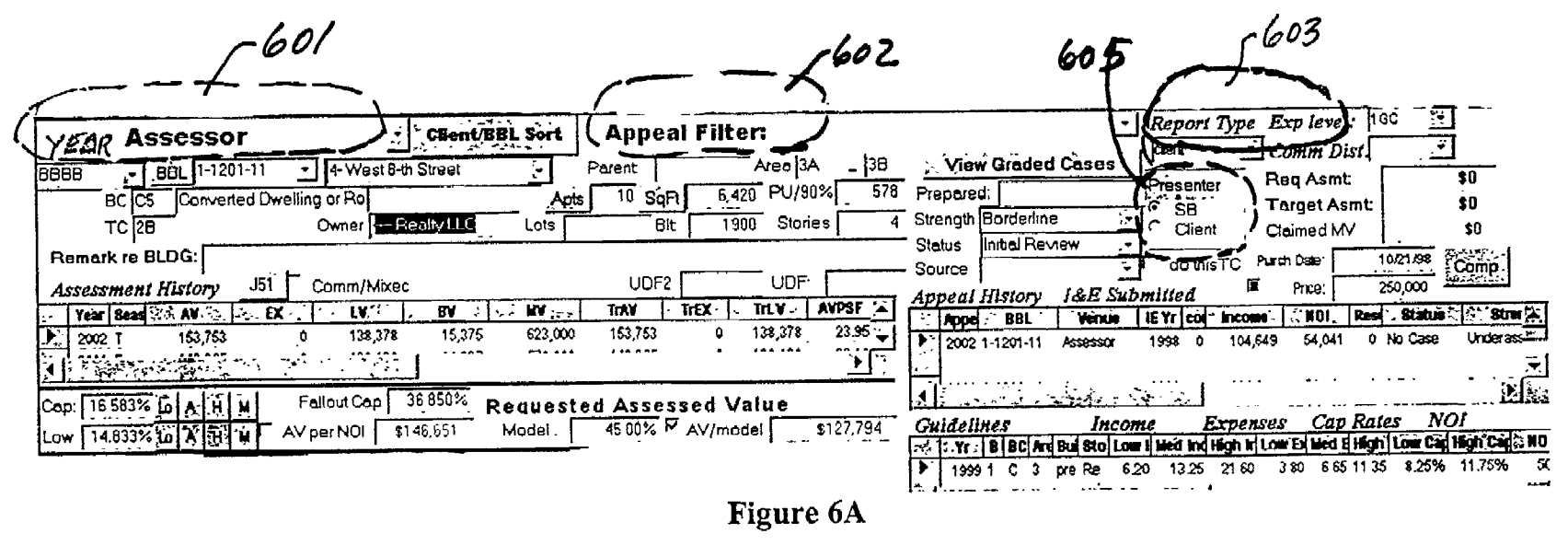
Figure 6B:
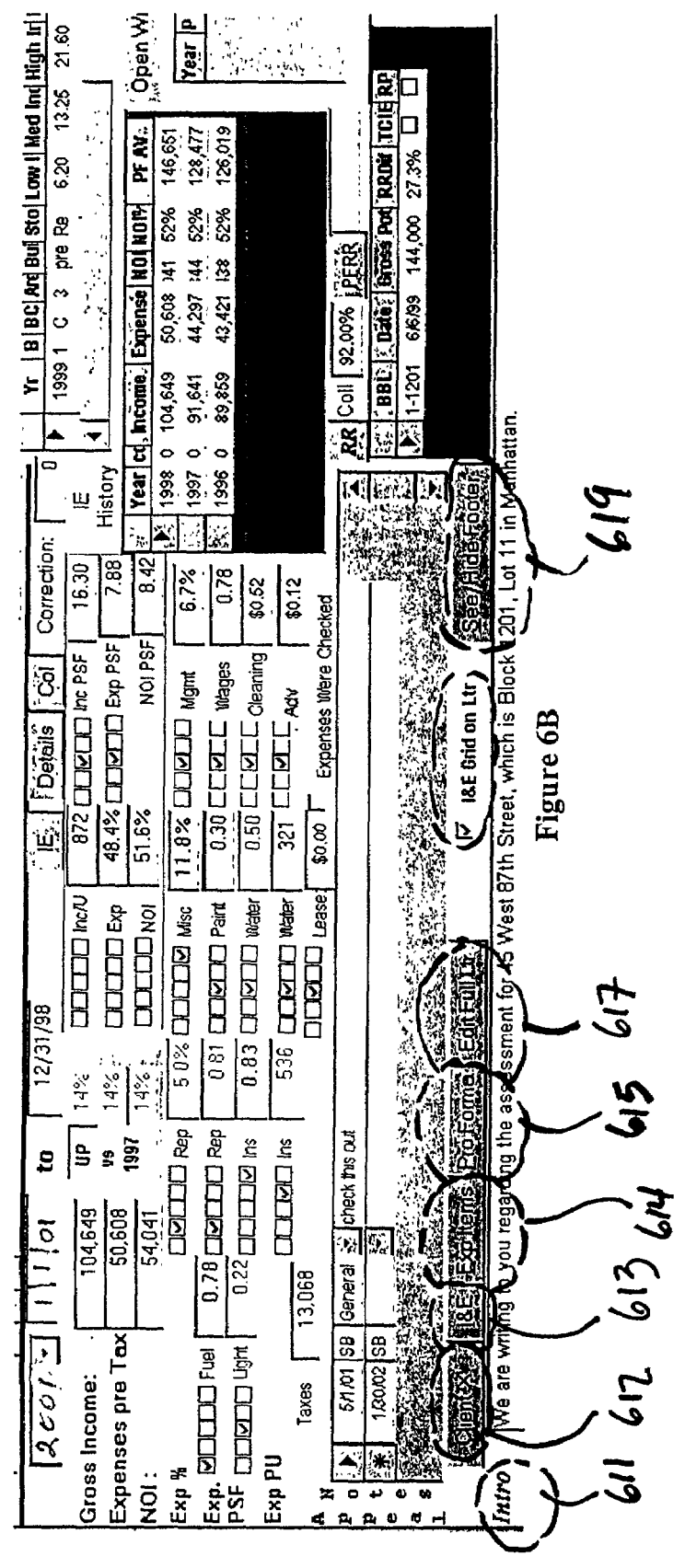

The system includes an Appeals Screen, which may be of the type shown in FIG. 6, and as further detailed in FIGS. 6A and 6B. The Appeals Screen of FIG. 6 provides a great deal of detailed information. Periodically (e.g., each season), each property may be reviewed to determine the feasibility of an appeal and to generate appropriate forms and correspondence to pursue an appeal. A user/client can review pertinent data on-screen, and override certain pre-programmed parameters (e.g., the program is designed to consider Wages high at certain levels; but the user may know that for a particular luxury building higher expenses would be acceptable.)

Many features of the Appeals screen are similar to those for the Client Review Screen. However, the purpose of the Appeals Screen is radically different. Client Review Screen is aimed at reporting to clients. The Appeals Screen is used to actually prepare cases for presentation to a governmental body (e.g., an Assessor) by reviewing the criteria and creating a narrative of the points of appeal. The sentences and comments generated on this screen are different than those on Client Review, are based on different criteria, and print out different reports.

The following are significant features of the Appeals form: The year and type of appeal of the currently viewed record is indicated in section 601 of FIG. 6A.

Appeal Filter section 602 (see FIG. 6A) gives the user the option of filtering for a certain year and appeal type (e.g., Assessor Appeal, TC Appeal, and/or Change by Notice Appeal).

Report Type control 603 (see FIG. 6A)—Since various types of reports have been created with distinct criteria, the user is given the option of selecting the type of report. This allows the user to customize the types of paragraphs generated within each type of report.

Presenter control 605 (see FIG. 6A)—The system is programmed to generate a very professional letter for submission to the Assessor or Tax Commission hearing officer. The letter analyzes various expenses and displays them in a table, as well as creating a narrative explaining how expenses and other factors should affect the Assessment. However, for certain cases or clients, it may be more beneficial to the owner to present the case on his own letterhead, and with a different format that does not echo, for example, the "Simon Brecher" (i.e., Applicant's) more standard presentation. To that end, some simplified letter formats were designed, which would be appropriate for various different types of owner (e.g. more sophisticated, less sophisticated etc.). Thus, although presenter defaults to "Simon Brecher", the analyst can choose "Client" for generating a letter on a Client letterhead format. Also the system may be programmed to produce a screen where the user can design a letterhead and letter format for each client, including customizing the layout of the letter.

1—As for the Client Review Screen, the user can choose a Cap Rate, and whether to use actual NOI or a model NOI based on actual Income. An additional possible Assessment can be calculated from Rent Roll (and model NOI).

2—"Client X Intro" control tab 612 (see FIG. 6B) either selects a particular client introductory paragraph or describes some of the factors typical of Client X's properties. Alternatively, the user can select "Standard Intro Par" via tab 611or write an introductory paragraph manually.

3—I&E control button 613 (see FIG. 6B) generates a paragraph about the Income and Expenses, while Exp Items tab 614 points out specific high or low expenses. This is similar to the Client Review Screen, except that the sentences created here are geared towards a city official (e.g., Assessor) who must be persuaded to accept presenter's arguments.

4—Pro Forma control 615 (see FIG. 6B) when activated produces a discussion of how the Assessment should be calculated, based on the chosen Cap Rate. The analyst/user selects whether to use actual NOI, a model NOI, or both, and the appropriate sentences are generated. This is a significant aspect of the system.

5—The user can click Edit Full Ltr control 617 (see FIG. 6B) to see the paragraphs generated for the letter taking up most of the viewing area (with a bare minimum of other information) to allow easier editing of the letter.

6—There is also a special See/Hide footer button 619 (see FIG. 6B) that can be seen (or hidden) where certain expenses can be discussed in greater detail for clients (like Client X) where there are standard Wage issues due to Union contracts, and other repeating issues.

Section 621 of FIG. 6 illustrates that a portion of the screen is reserved for providing comments generated as part of the Appeals Screen and that typical sentences and comments may be generated.

Figure 7:
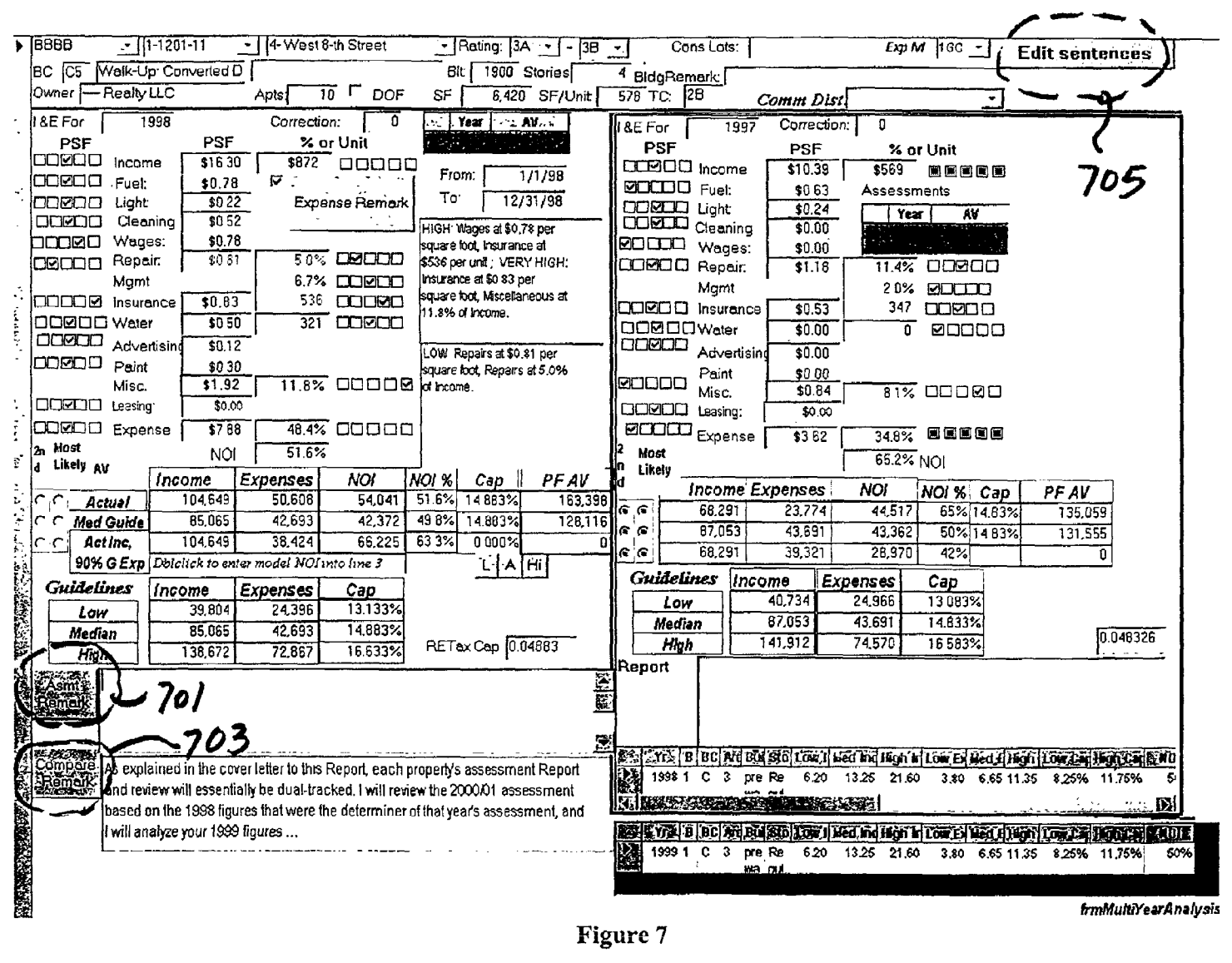

The system has also been designed to produce a Multi Year Analysis Screen of the type shown in FIG. 7. This form was generated and the system was programmed to analyze each property's Income & Expense History as it relates to its Assessment history.

For each property and each year, the system is programmed to explain what high or low expenses might be taken into account to influence an assessment. By way of example, as to a selected property, each year's NOI can be compared to NYC guidelines for the year in question, as well as to the previous year's I&E and Assessment. For each property, the analyst/user then selects whether the actual I&E, an NOI based on Guidelines, or true Income along with Expenses appropriate per Guidelines would be the most likely choice or a second most likely choice.

Clicking "Asmt (Assessment) Remark" control 701 will generate a paragraph expressing an opinion as to what a reasonable Assessment would be for that year. The system also has a Compare Remark control 703 which notes the increase or decrease from the previous year and provides corresponding comments. These sentences created by control 701 and 703 are editable.

Moreover, for a particular report, the system by means of control 705 allows the analyst to edit the way sentences are built by showing a form with the phrases that are in turn used by the program to generate each paragraph. Thus, if the analyst has found himself editing a number of paragraphs by hand because he prefers a slightly different wording, he can change the actual set of phrases used from then on to generate subsequent paragraphs.

This report may prove extremely useful to clients who have two or more years of Tax Commission appeals or Supreme Court Writs pending. Upon receiving an offer from the Tax Commission, the Law Department of the City or a decision from a state Court, the client is able to refer to the analysis or decision and evaluate whether the offer is a good one that should be accepted, or whether he has a strong enough case to hold out for a better offer.

Figure 8:
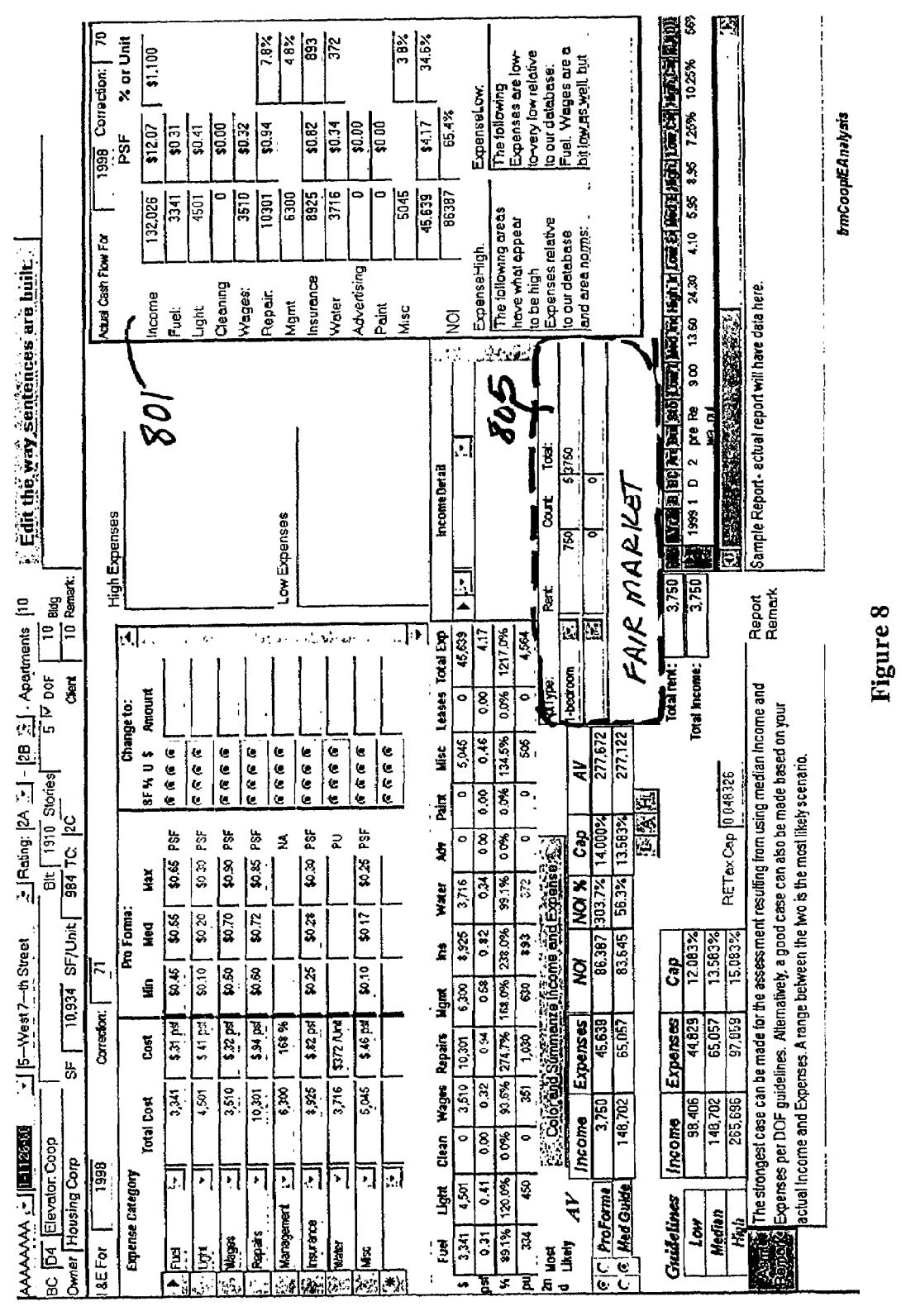

The system may also include a Co-op Comparison Screen of the type shown in FIG. 8. This screen allows an analyst to propose an assessment for a co-op based on Income and Expense norms for rental properties of similar building types within the borough or similar geographical area, since co-op Income and Expenses are not considered true indicators of Assessment. The actual Cash Flow may be shown in a section 801, while the analyst can choose a pro forma number in section 803, using square footage, per unit or percentage as appropriate for the expense from comparable rental properties. An analyst can also enter a breakdown of fair market value rents to determine what the potential collections of a given property would be. In other respects, this screen has many of the same features as the Multi-year comparison.

Figure 9:
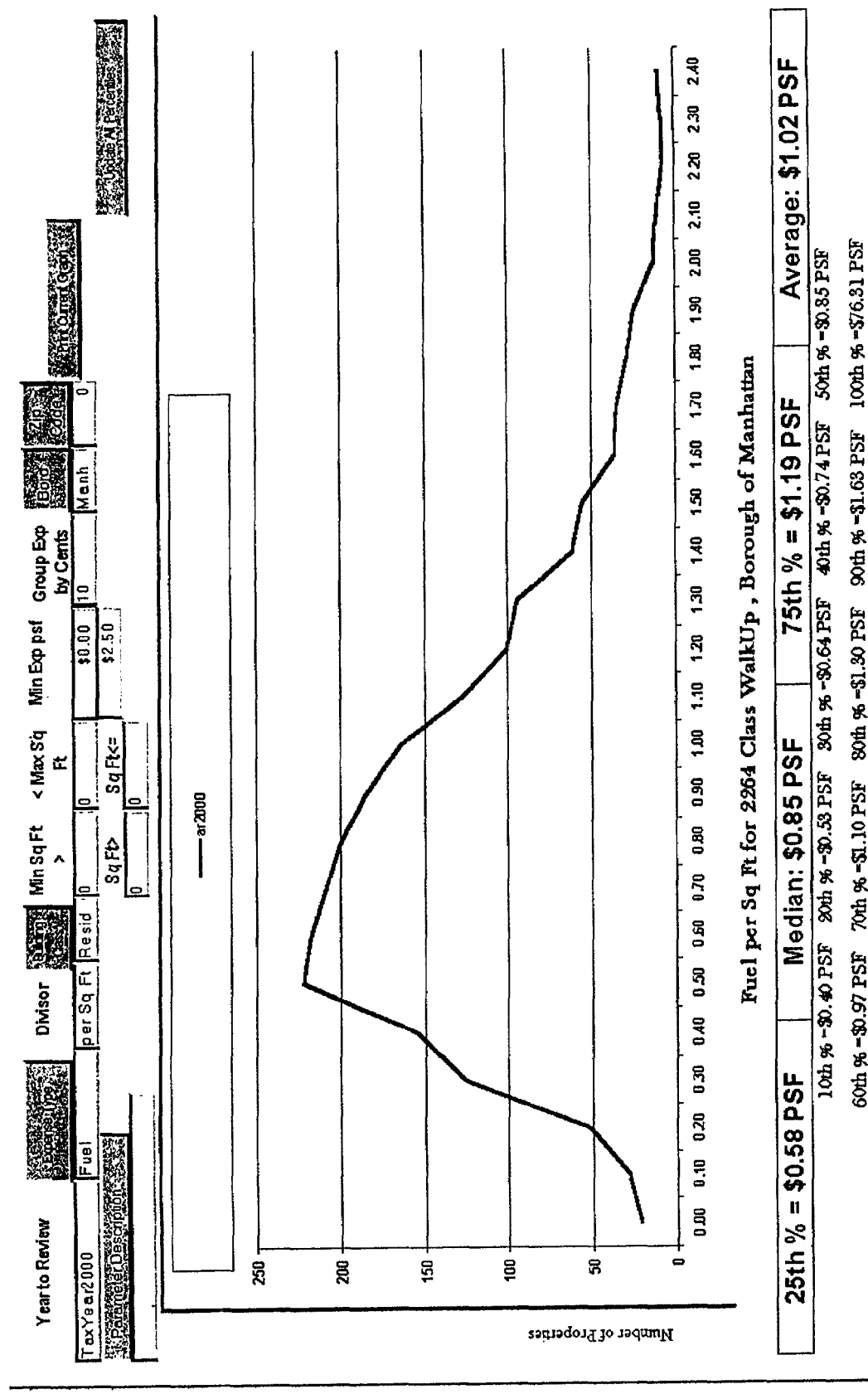
FIG. 9 depicts a single (or multi) expense graphing screen embodying the invention.
Figure 10A:
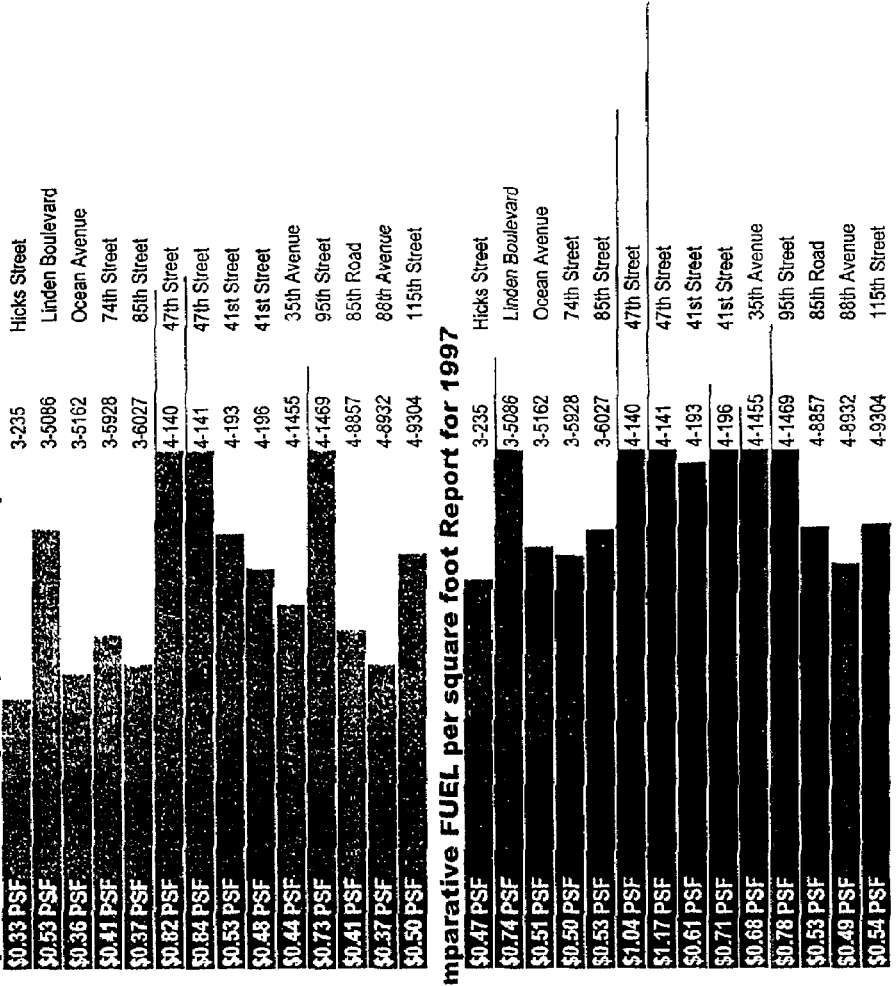
Figure 10D:
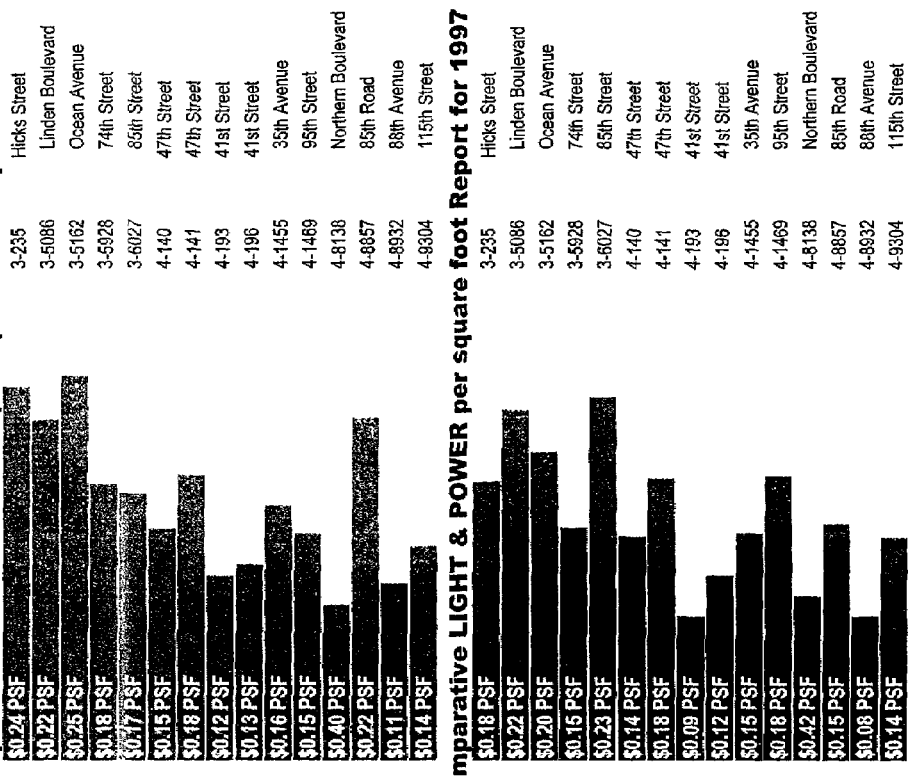
Figure 10F:
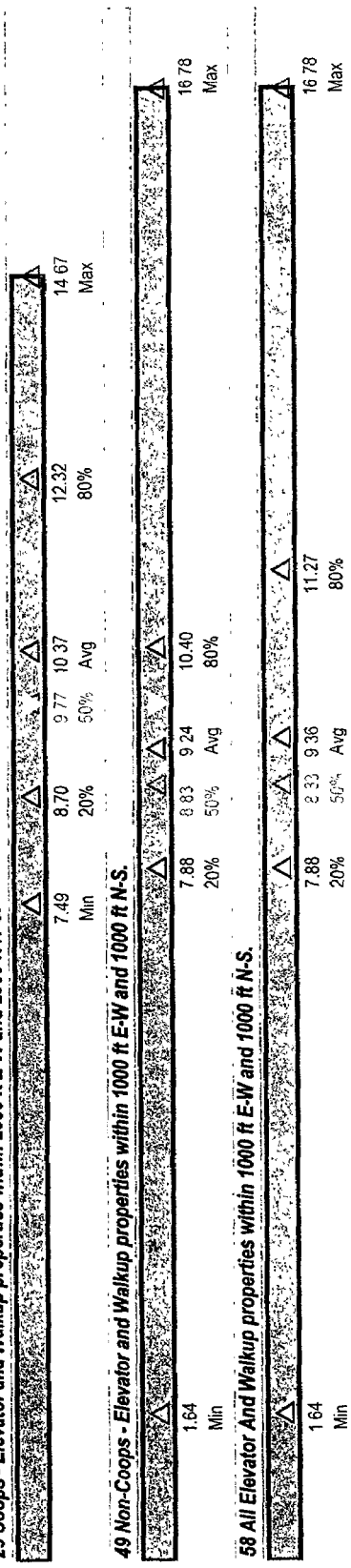
Figure 10H:
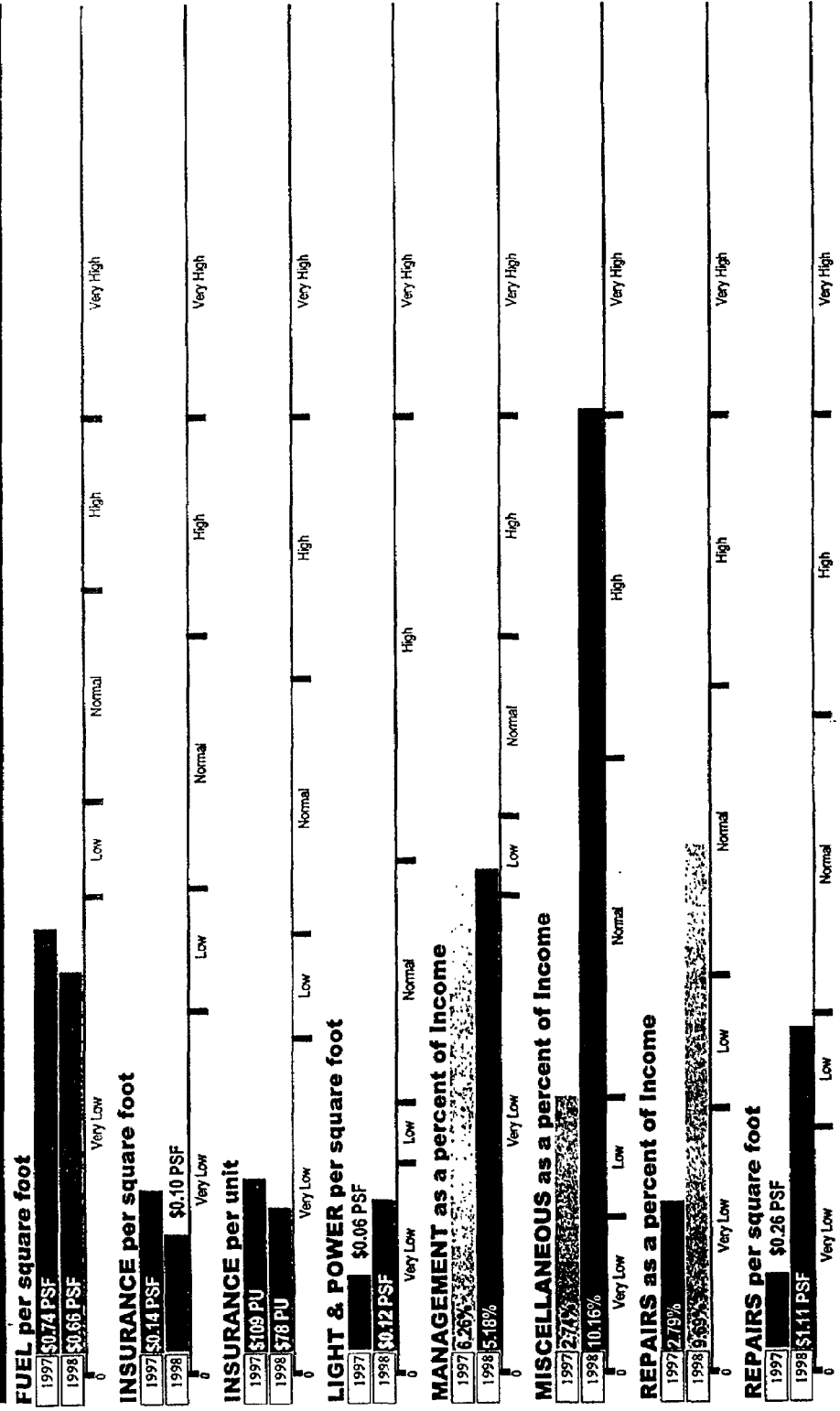
FIG. 10H is a bar graph comparing expenses of one property with those of other properties.

The system has also been programmed to produce a Single Expense Graphing Screen of the type shown in FIG. 9. Although this information is also generated as a specialized report, it is described here because it can be used as an analysis tool.

The system may be programmed to enable a client/user to run a specific analysis of any given expense after making the following selections:
a) Data source—this can be Tax Commission data for 1999, 1998 etc., or the entire client data base for the current year, or the client's properties;
b) Expense Type (Fuel, Light & Power, Wages, Repairs etc.);
c) Divisor—choose from per square foot, per unit, per room, percentage of income;
d) Building class such as walkup or elevator apartment building, office, factory, store building etc.;
e) Do you want only buildings of a certain size? If so, fill in minimum square footage and maximum. If you have selected per unit, you can choose a minimum and maximum unit size, etc.;
f) Do you want to exclude ridiculously high or low expenses? The system assumes greater than 0 as the minimum, and chooses a default maximum for each expense, both of which can be overridden;
g) Group the expenses. Since it's impractical to graph every single expense, certain expenses can be grouped to determine a range within which the costs lie (e.g., how many buildings are at 0 to 5 cents, how many are at 5 to 10 cents, etc.).
h) "Boro"—all boroughs in New York City or one specific borough.
i) Zip code—allows the client/user to see how a specific zip code may differ from others.

Once the user makes these selections, the user can click a control such as Show Bar Chart to display a graph to the screen. The user can also choose to create a table of percentiles or quartiles on this screen, to be stored in a table for future use. The user can also have the current selections done for all Expense categories, all boroughs separately etc. . . The screen of FIG. 9 may be used to create a table of percentiles, e.g., for each borough, building class and expense type, what is the $10^{th}$, $20^{th}$, $30^{th}$ percentile etc. This may be very useful in determining a normal range of values for each type of expense. The user can also print out a set of graphs for those clients who request them. This also allows the analyst to ask all sorts of very specific questions such as "what is the average water per unit used in zip code 11219 for walkup buildings over 5 units". Thus, a specific property can be reviewed both as compared to general guidelines, and as compared to a very specific subset of the properties most like it.

Referring to FIG. 10, there is shown a comparison "COMPS SCREEN" which allows the user to select a particular property or portfolio of properties and then run a series of statistical comparisons of I&E and/or Assessments between a selected property and surrounding properties. The user can refine the comparisons based on:
(a) selecting a specific distance or area within which to run the comparison (or run it for a whole boro);
(b) selecting a specific building class or group(s) of building classes, e.g.,:
  (i) run for only selected property's class (e.g., D4)
  (ii) run for an entire building type (all co-ops—C6, D0, D4)
  (iii) run comps for each of the above combinations;
  (iv) create any combination deemed useful by the user.
(c) selecting minimum number of properties to include;
(d) selecting which income or expense categories to compare (only paint, paint and repairs, etc.,);
(e) selecting which year's information to run the comp on (1998 I&E, 2000 I&E, current Assessments, etc.,);
(f) the user then clicks a button and the system is programmed to calculate and show the comparisons on the screen. The calculations can be saved for present and future use (reporting).

Graphs may be generated for fuel (or light, or any other selected expense) per square foot or on a per Unit basis for a selected property compared to average fuel (or light, or any other selected expense) per square foot or per unit for all like properties (or properties having certain characteristics) within a given distance (see FIG. 10G). The assessed value of a selected property per square foot or per unit compared to average assessed valuations per square foot or per unit for other properties within a given radius may be calculated and shown (see FIG. F). Thus, graphs of the type shown in FIGS. 10F and 10G may be used to show a property's income and expenses and/or the property's assessments as compared to other (like) properties in the immediate surrounding area. Alternatively, the comparison may be based on other selected or programmed criteria.

By way of example, an analysis of expenses for a particular property compared to a group of sample properties, illustrated by means of bar graphs, may include: 1—Fuel per square foot (see FIG. 10A for years 1997 and 1998); 2—Insurance (a) per sq. ft. (see FIG. 10B for years 1997 and 1998); or (b)per unit (see FIG. 10C for years 1997 and 1998); and 3—light and power per sq. ft. (see FIG. 10D for years '97 and '98).

Similarly, graphs may be generated for selected years as illustrated for the management costs as a percent of income for '97 and '98 (see FIG. 10E).

Similarly, graphs (not shown) may be generated, by way of example, for miscellaneous costs as a % of income; painting per sq. ft.; repairs as a % of income and/or per sq. ft.; wages per sq. ft.; and water and sewer per sq. ft. and/or per unit.

Thus, on the basis of I&E screens of the type shown in FIG. 4 and all the other screens discussed above and any and all information inputted into the system a series of highly sophisticated I & E reports may be generated which give various analyses of the individual Expense (and income) components, as further discussed below. Some are best viewed per unit, such as Water & Sewer and Insurance (see FIG. 10C). For some it is useful to look at the Expense per square—foot for example, Fuel and Electric (Light)—see FIG. 10D. Graphs generated in accordance with the invention make it easy to identify items that are exceptionally high or low when compared to other properties within the client's portfolio or other properties, so that the client can examine costs within their own portfolio or other properties. The user can also raise questions asking for greater detail on unusually high expenses that can be used as backup documentation to convince an assessor, or any taxing authority, to accept figures that are higher than guidelines allow.)

Thus, graphs of the type shown in the various figures may be used to compare each property within a portfolio to each other and to point out if any particular property has an expense that is unusual for this particular portfolio.

The graphs shown in the figures (e.g., FIG. 10H) may be used to compare each property to developed norms generated on the basis of NYC Tax Commission information, DOF information, information gleaned from thousands of submitted I&Es, a client's information and Applicant's own extremely accurate data base of over 3500 RPIE. These graphs may be used by themselves or as part of reports to produce a comparison between a property's expenses and the "norms" (expressed clearly in the bar graph). These norms may be based both on NYC DOF averages, as gleaned from the tens of thousands of annual RPIEs filed, and Applicant's extremely accurate database of the over 3,500 RPIEs. Properly used, deviations from the "norms" can be a strong management tool and may be brought to the attention of a practitioner or attorney, who can then present a stronger, more detailed case for tax reduction.

A significant aspect of the invention is that it enables a property owner, manager or investor, to visually see the Income and Expenses and Assessments as compared to numerous like properties and on the basis of any selected and/or desired criteria.

Applicant has developed a multi-section report that offers insight into properties, their expenses and Assessments. One such report, an Assessment Recommendations report, is shown in FIG. 11 which is designed to summarize important points noticed in a review of the properties. The Assessment Recommendations report has multiple sections and includes:

I—a section 1111 which includes a basic physical description of the building (per DOF or others).

II—a section 1112 which includes assessment information for the past and present and tentatively for future with increases and estimated tax bills; and a section 1113 which includes exemption and abatement (J51) information, if applicable, and taxes due.

III—a section 1114 which includes an outline of potential appeals venue (e.g., assessor or tax Commission) and evaluation of chances for successful appeal in keeping with information also formulated on Client Review and Appeals Screens.

IV—a section 1115 which includes income and expense (I&E) information for the current year and prior years (where available) and comparisons for selected years. This data is generally available from a client and is the same data submitted on their RPIE. Where the data is not available, it is possible to get the most recent Tax Commission Income and Expense (TCIE) filings, through the Freedom of Information Act; and a section 1116 highlighting extraordinary income and expense items.

V—A section 1117 which includes a narrative portion of the report and an explanation of recommendations made to the client and any other information which may be unclear.

The report shown in FIG. 11 as well as the other reports all include some of the most important facts about the properties. Typically, first, basic physical data is presented. Often, this can point out some errors on the part of the DOF. A client's alternate address, different from the DOF will be shown as AKA. What is known about the number of units and square footage, as well as the year built and number of stories is also included in one or more of the reports.

Another section of one or more of reports may include a summary of income and expense information, as well as a comparison between past years, if applicable. Some data is based on RPIEs, where provided. For those buildings where RPIE data is not available, it is often possible to get TCIEs (Tax Commission Income & Expense statements) through the Freedom of Information Act, if a TCIE has been filed. Sometimes these TCIEs are for previous years, in which case the data may not to be taken at face value.

In the appeals recommendation section, the analyst's can recommend whether there is a case for appeal and what is the most efficacious appeal venue. The reports can be used to show current assessment, as well as the increase or decrease from the past year. When an increase in assessment is large, it is sometimes possible to get a reduction based on a "mercy" appeal, although the assessment may be technically supported.

Also, there is a narrative section in the report of FIG. 11 used to explain some aspects of the report and to list some important I&E items. This section of the report is designed to call attention to physical or financial data that look unusual or appear difficult to understand. For those items, inputs from the client may be solicited.

There is also a list of Exemptions and Abatements, where and when available.

"Co-op" Cooperative properties may have a section listing the foundations for a pro forma analysis (such as the Fair Market Rents) and comparables. This may be part of a narrative section.

Figure 12:
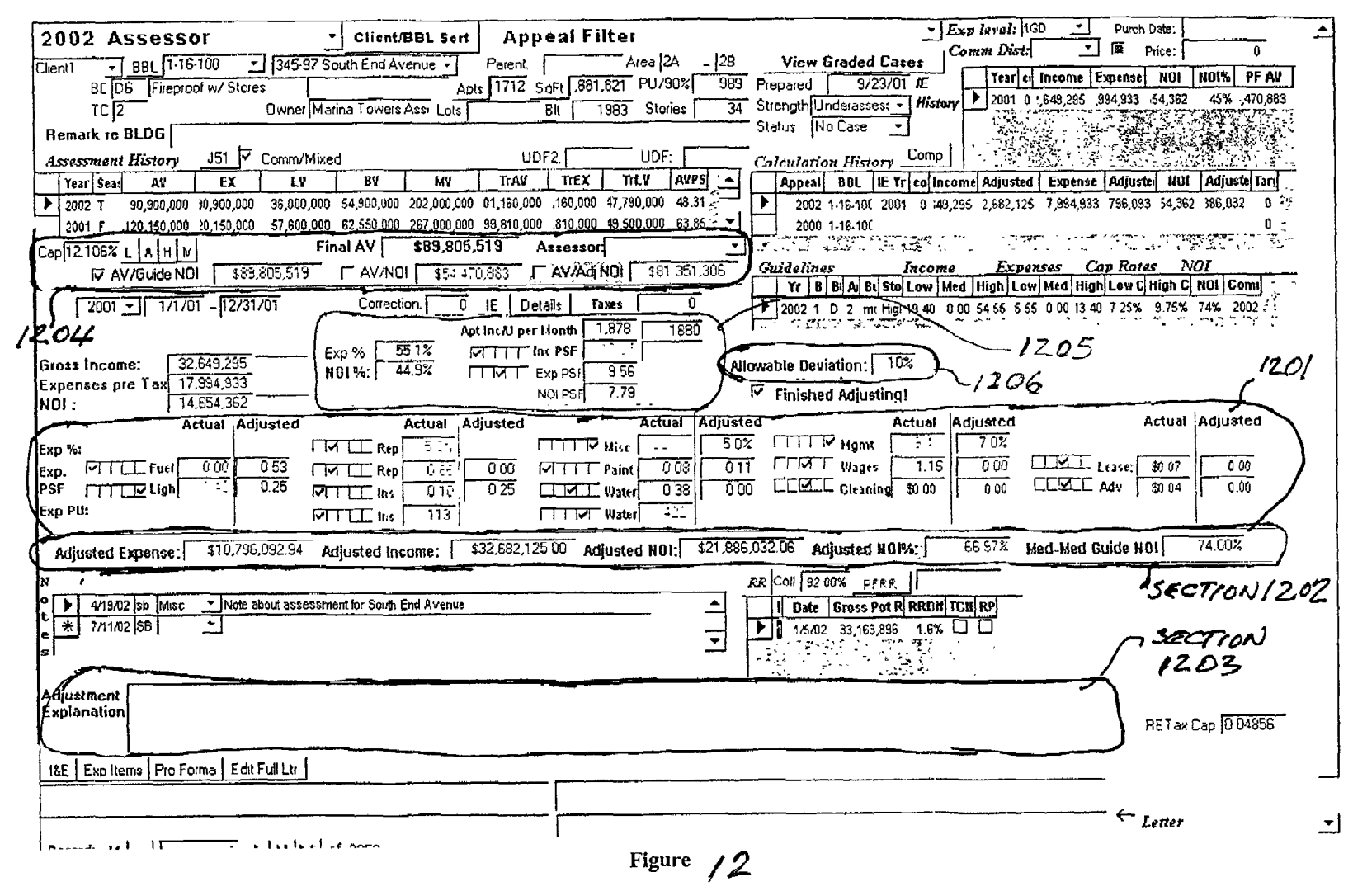

The Appeals screen shown in FIGS. 6, 6A and 6B may be modified as shown in FIG. 12 and additional features may be introduced. Referring to FIG. 12 note that one aspect of the invention pertains to handling of income and expense items. For ease of explanation sections 1201 and 1205 of FIG. 12 have been redrawn in FIG. 12A and 12B, respectively, to more easily describe the function being performed. By way of example, nine (9) selected expenses items (repairs, insurance, painting, water, management fees, wages, cleaning, fuel and light) are specifically identified and separately shown in FIG. 12A. In addition, miscellaneous expense items may be separately tracked as well as total expenses. Similarly, selected income items (e.g., store, apartment, miscellaneous and total) are specifically identified and separately shown in FIG. 12B. For the FIG. 12 screen, these income and expense items are used to calculate the net operating income (NOI) and may be used to claim a change in tax assessments or valuation of a specific building. As detailed in FIG. 12A, section 1201 may be used to display of the "actual" amount of each expense item. Likewise, section 1205 may be used to display the actual amount of selected income items. FIGS. 12A and 12B also shows that an "adjusted" value for each of the income and expense items may also be simultaneously displayed. The income and expense items may be "adjusted" based on available statistical information pertaining to like class of buildings, or based on knowledge of what the income items and expense items should be for a selected property. As discussed above, this information may be used for requesting a change in taxes, assessments and/or determining the value of the building and/or verifying the assessment of the property and/or any other suitable purpose. The system may be programmed, as discussed above, such that the actual and adjsuted income and expense items may also be calculated and displayed on a per square foot (PSF) basis and/or on a per unit (PU) basis, and/or on any other predetermined basis or bases. In FIGS. 12A and 12B the actual and adjusted values of selected income and expense items are identified and simultaneously displayed. As already noted, there is a significant amount of statistical data pertaining to each of these expenses for like buildings. This statistical data may be stored in the system's database or may be obtainable from government or other sources. In accordance with the invention, the user (e.g., the property owner seeking a reduction in taxes or any other entity interested in valuing the property) can show a proposed adjustment (higher or lower) for the income or expense item. The actual amount as well as the adjusted amount are retained and viewed, to enable a user/viewer to immediately compare the numbers. [Note that certain expense items may not be adjusted. This may be indicated by color coding the non-adjustable expense items.]

A feature of the system is a program accessed by specially selecting (e.g., double clicking on a particular item) an expense (or an income) item. When this is done, a screen (see FIG. 13) is brought up which shows actual percentile values for each expense item for a selected building type. These values can then be used to create a new 'adjusted' expense item amount to insert into the "Adjusted" column of FIG. 12A (or FIG. 12B). note that the FIG. 13 screen may be printed and attached to a print out of the FIG. 12 screen to show the basis for adjustments introduced in FIGS. 12A and 12B.

FIG. 12 also includes a section 1202 in which the adjusted total expenses, adjusted total income and adjusted NOI may be displayed after they have been calculated.

An additional feature of the system is a section for explaining adjustments which are made which are greater than a predetermined level. Thus, as illustrated by section 1203 of FIG. 12, any adjustment of an income item, expense item, total income, total expenses or NOI which is greater than a predetermined percentage (allowable deviation as set in section 1206) will force a user to enter an explanation of why such a large adjustment is justified. This may be accomplished by causing the "cursor" to go to a box (e.g., 1203) where the user must type in an explanation of the adjustments. Note that a supervisory entity may set the extent of the deviation below which no explanation is needed and above which an explanation is required. Any adjustment in excess of the set (allowable) deviation will require an adjustment explanation. By way of example, the adjustment explanation will cause a user submitting a request for a tax change to explain the basis for the "greater" adjustment, which explanation is then recorded. Alternatively, this feature may be used to ensure that any city assessor who accepts an adjustment request of greater than a given amount tbe made to provide justification for his actions.

Color coding of item in section 1204 and items in section 1202 is also used. Each NOI—Adjusted NOI%, Med-Med Guidelines NOI and (in section 1205) NOI %, are color coded to match their respective, resulting pro forma Assessments in section 1202: AV/Adj NOI, AV/Guide NOI, and AV/NOI. The user may then select one of these pro forma Assessments as backup to his claim for appeal, creation, adjustment or verification of an assessment.

What is claimed is:

1. A method of using a computerized data base for analyzing, processing and formatting data pertaining to a selected building comprising the steps of:

inputting data into a computerized data base, where said data pertains to a multiplicity of buildings obtained from selected sources including governmental agencies and private sources, and wherein said data includes various income and expense items pertaining to said multiplicity of buildings;

processing the data pertaining to the multiplicity of buildings to develop standard values for selected ones of the income and expense items;

inputting into the computerized data base, via a specially designed screen, selected data pertaining to income and expense items pertaining to the particular building; said screen including prompts for inputting data in a prescribed manner and sequence to increase the efficiency and ease of processing the data; the screen being part of a set of specially designed screens for arranging the storing and processing of data related to the real estate industry and for performing analytic and reporting functions related to the operation, evaluation and management of buildings;

programming the computerized data base to compare the selected data pertaining to income and expenses of the selected building with the standard values developed for like buildings;

identifying selected ones of the income and expense items of a selected building and displaying the actual value of selected income and expense items using said screen; and generating proposed adjusted values to selected ones of the income and expense items based on the standard developed values and displaying them on the screen, whereby the actual value of selected income items and expense items and the proposed adjusted values are simultaneously displayed for providing an enhanced computer aided tool to manage and operate the building including the selective filing of appeals and the selective production of reports.

2. A method as claimed in claim 1, wherein there is included a plurality of different screens to input and obtain data from the data base for assisting in performing different functions; wherein the screens include controls for selectively enabling and controlling the processing of data in a variety of predetermined modes and formats; and wherein the computerized data base may be programmed to request an explanation for any proposed adjustment greater than a predetermined value.

3. A method as claimed in claim 2, wherein the proposed adjusted values may be derived from statistical values obtained from a number of buildings similar to the selected building; and including the step of utilizing selected screens for analyzing, processing and formatting the stored and inputted data for selectively enabling the computerized data base in the production of reports pertaining to selected ones of (a) income and expenses; (b) clients; appeals; (d) taxes; (e) various government agencies.

4. A method as claimed in claim 3, wherein the computerized data base is programmed to respond to the step of clicking on an income or expense item displayed on an income and expense related screen for selectively processing selected income and expense items in a pre-selected manner and selectively bringing up a table displaying the actual percentile values for each expense item corresponding to the selected building.

5. A method as claimed in claim 3, wherein there is included a screen for enabling the storing of detailed information pertaining to capital repairs which may be amortized over a specified number of years and for assisting in the calculation and allocation of amortization amounts; and wherein selected screens enable the inputting of data into the data base such that the buildings in the multiplicity of buildings are arranged by types and location and the particular building is compared to the standard values generated for like buildings in a similar area.

6. A method as claimed in claim 2, including the use of a specialized screen to input data pertaining to selected income and expense items into the computerized data base and to retrieve and display data from the computerized data base pertaining to the expense items including a section for selectively entering information pertaining to the amount paid to amortize a mortgage and the total amount of the mortgage payment for interest and principal to enable the selective generation of computer aided income tax and financial reports.

7. A method as claimed in claim 6, wherein one of said plurality of different screens is programmed to enable the computerized data base to create a pro forma assessment based on a selected set of adjusted or actual income and expense figures.

8. A method as claimed in claim 7, wherein one of said plurality of different screens is programmed to enable the computerized data base to issue a report specially prepared for creating, adjusting, appealing, or verifying an assessed valuation (AV) of the property.

9. A method of using a computerized data base for analyzing, processing and formatting data pertaining to a selected building comprising the steps of:

obtaining data pertaining to a multiplicity of buildings from selected sources including governmental agencies and private sources; where said data includes certain physical characteristics of the buildings and various income and expense items pertaining to said buildings;

inputting said data into the computerized data base using a set of specially designed screens and developing standard values for selected ones of the income and expense items; the set of specially designed screens for arranging the storing and processing of data related to the real estate industry and for performing analytic and reporting functions related to the operation, evaluation and management of buildings;

inputting into the computerized data base selected data pertaining to income and expense items pertaining to the selected building using at least one of said screens designed for the processing of income and expense items;

programming the computerized data base, with the assistance of said screens, to compare the selected data pertaining to income and expenses of the selected building with the standard values developed for like buildings;

generating adjusted values for selected ones of the income and expense items based on available statistical data pertaining to like buildings or knowledge as to what the income and expense item should be; and using selected ones of the screens for simultaneously displaying the actual values of expense items for a selected building and the adjusted values of corresponding expense items obtained from similar buildings to the selected building.

10. A method as claimed in claim 9 including using selected ones of the screens for selecting an expense item being displayed and in response thereto displaying values of expenses for corresponding buildings to the selected building; and using selected ones of said screens for selectively generating a computer aided report selectively (i) requesting a change in taxes, (ii) a change in assessment, (iii) determining the value of the building, (iv) verifying selected conditions of the building.

11. A system for analyzing and processing data pertaining to a selected building comprising:

a computerized data base for storing basic data pertaining to a large number of buildings, where the stored basic data includes information concerning at least one of: (a) the number of units in the buildings; (b) the area of the buildings; and assessment valuations for the buildings; said computerized data base also including information regarding various expense items and income items pertaining to certain ones of said large number of buildings;

a plurality of specialized screens for inputting data into said computerized data base and for obtaining data from said computerized data base, the screens being part of a set of specially designed screens for arranging the storing and processing of data related to the real estate industry and for performing analytic and reporting functions related to the operation, evaluation and management of buildings; selected ones of said screens being programmed to enable the computerized data base to calculate selected ones of the various income or expense items on at least one of the following bases; (a) a per unit area basis, (b) a per unit basis, and as a percentage of the income of the building; said calculation for establishing norms for selected ones of the various expense and income items using said large number of buildings as a base;

means including a specialized income and expense screen selected from said specialized screens including prompts for inputting income and expense data pertaining to said selected building into said computerized data base in a prescribed sequence and manner to increase the efficiency and ease of processing the data;

means including said specialized income and expense screen for calculating selected ones of the income and expense items of the selected building using at least one of the following bases; (a) a per unit area basis; (b) a per unit basis, and as a percentage of the income of the selected building; and means including said specialized income and expense screen for simultaneously displaying the income and expensed items of the selected building and corresponding norms obtained for the large number of buildings for enhancing the management and operation of the building or its valuation.

12. The system as claimed in claim 11 wherein said data base is generated from at least one of the following: government records, trade sources and private sources.

13. The system as claimed in claim 12, wherein selected screens of said plurality of specialized screens for interactively inputting data into the computerized data base and for processing the data and selected ones of said screens also functioning as templates for producing reports pertaining to the income and expenses of the selected building.

14. The system as claimed in claim 13, wherein one of said set of screens is for generating selected ones of pro forma assessments, appeals, adjustments, or verification of existing assessments and wherein said appeals screen includes sections for enabling the storing of assessment history regarding the building, identifying selected income and expense items, selecting the type of report to be prepared, enabling a program for generating a letter analyzing various expenses and displaying them in a table and creating a narrative.

15. The system as claimed in claim 14, wherein one of said set of screens is for enabling the computerized data base to assist in generating an income and expense report.

16. The system as claimed in claim 11 wherein selected screens includes means for processing income and expense items including entries for: (1) client name; (2) borough, block and lot number (BBL); (3) the year of interest; (4) correction status; (5) address of the property in question; (6) alternate address name (AKA), and corporate name; (7) real estate taxes; (8) income; (9) net operating income (NOI) which is equal to gross income minus total expenses; (10) the percentage of the income retained as NOI; (11) the number of units (e.g., apartments) according to the governmental agency; (12) the building class (BC); (13) a section for entry of various expenses organized according to categories either defined by the client or per a format dictated by a government agency for reporting expenses); (14) a section including columnar entries to enable expenses (or part of the expenses) to be moved from one category to another category; (15) a section for tracking Capital Repairs and their amortization; (16) a section for tracking income by categories; (17) a section for tabulating the various expenses and the cost of the various expense items on either: a) a per square foot basis (psf); b) a % of income basis; and/or c) a per unit basis.

17. The system as claimed in claim 16 wherein said selected screens include a section which includes a control button for activating a program for summing the amounts for the different expense and income categories and produce total income, total expenses, the NOI, and NOI pct and insert (record) these items within selected portions of the screen providing tabulation of various income items including per sq. ft. basis and per unit basis.

18. The system as claimed in claim 11 wherein a selected income and expense (I & E) screen includes a section for processing the debt burden of the building including means for entering information pertaining to the amount paid to amortize a mortgage and the total amount of the mortgage payment for interest and principal and the different types of income.

19. The system as claimed in claim 11 wherein a selected income and expense (I&E) screen functions to assist in an interactive system in which pertinent data is made available to the user who can then update and then use or save the updated/altered information.

20. The system as claimed in claim 19 wherein selected screens enable the processing and formatting of income and expense items to enable a user to use the resultant information to prepare any number of reports needed for governmental authorities or for personal, owner related purposes.

21. The system as claimed in claim 19 wherein the screens enable the programming of the data base to provide prompts to enable a user to introduce a new category or to correct an entry to an existing one or to verify the acceptability of selected entries.

22. The system as claimed in claim 19 wherein selected screens are programmed to provide a total while still allowing a user to see detailed information to enable the retention and analysis of the information pertaining to at a particular category or item.

23. The system as claimed in claim 19 wherein selected screens sections are programmed to enable a shift of certain items from one category to another including commands to specify a shift from one category to another new category and maintaining a record of what was shifted.

24. The system as claimed in claim 19 wherein selected ones of the screens include selected ones of the following control functions: (1) create a correction; (2) look up; (3) open notes;

(4) adjust expenses; (5) enter rent roll; (6) save record; (7) create co-op pro forma form; (8) create detail records; (9) assessment history;

and (10) enter rent roll.

25. The system as claimed in claim 24 wherein the screen controls enable the storing of a changed record and of the original record and the keeping of an audit trail identifying data shifted from one category to another.

26. The system as claimed in claim 24 wherein the adjust expense control enables a shift from any one expense category to any other expense category and from one form of presenting data to another.

* * * * *